(12) United States Patent
Oh et al.

(10) Patent No.: US 8,096,887 B2
(45) Date of Patent: Jan. 17, 2012

(54) FIXED TYPE CONSTANT VELOCITY JOINT

(75) Inventors: Seung Tark Oh, Farmington Hills, MI (US); Tae Hong Kim, West Bloomfield, MI (US)

(73) Assignee: Hyundai Wia Corporation (KR)

( * ) Notice: Subject to any disclaimer, the term of this patent is extended or adjusted under 35 U.S.C. 154(b) by 354 days.

(21) Appl. No.: 12/360,837

(22) Filed: Jan. 27, 2009

(65) Prior Publication Data

US 2010/0190558 A1 Jul. 29, 2010

(51) Int. Cl.
*F16D 3/223* (2011.01)
(52) U.S. Cl. ........................ 464/145; 464/906
(58) Field of Classification Search .......... 464/144–146, 464/906
See application file for complete search history.

(56) References Cited

U.S. PATENT DOCUMENTS

| | | |
|---|---|---|
| 6,267,682 B1 | 7/2001 | Sone et al. |
| 6,431,988 B1 | 8/2002 | Tone |
| 6,709,338 B2 | 3/2004 | Weckerling et al. |
| 6,848,999 B2 | 2/2005 | Weckerling et al. |
| 7,001,281 B2 | 2/2006 | Krude |
| 7,112,140 B2 | 9/2006 | Weckerling |
| 7,393,284 B2 | 7/2008 | Hassenrik et al. |
| 7,396,285 B2 | 7/2008 | Weckerling |
| 2009/0149263 A1* | 6/2009 | Kozlowski et al. ........... 464/145 |

FOREIGN PATENT DOCUMENTS

DE 2 361 875 * 6/1974 .................... 464/144
* cited by examiner

*Primary Examiner* — Gregory Binda
(74) *Attorney, Agent, or Firm* — Park & Associates IP Law, P.C.

(57) ABSTRACT

A constant velocity joint for a drive system comprises: an outer race having a plurality of guide grooves formed in an axial direction in the inner spherical surface of the outer race; an inner race having a plurality of guide grooves formed in an axial direction in the outer spherical surface of the inner race, said guide grooves of the outer race and the inner race together forming a plurality of ball guide tracks; a plurality of balls disposed in the ball guide tracks; and a cage installed between the inner spherical surface of the outer race and the outer spherical surface of the inner race, said cage having a plurality of windows for retaining the balls therein. Each guide groove of the outer race is shaped to have a longitudinal cross section formed with two circular regions with different centers, a first circular region disposed at a first lateral side of the outer race and a second circular region disposed at a second lateral side of the outer race, and a linear region tangentially extending between these two circular regions, and each guide groove of the inner race is shaped to have a longitudinal cross section formed with two circular regions with different centers, a first circular region disposed at a first lateral side of the inner race and a second circular region disposed at a second lateral side of the inner race, and a linear region tangentially extending between these two circular regions.

9 Claims, 44 Drawing Sheets

FIXED TYPE CONSTANT VELOCITY JOINT

FIELD OF THE INVENTION

The present invention relates to a constant velocity joint, and more particularly, to a fixed type constant velocity joint for a drive system, which is typically used in a drive axle of, for example, an automobile for transmitting rotational torque between the rotating shafts with relatively high operating angle.

BACKGROUND OF THE INVENTION

Constant velocity joints typically used in the drive system of vehicles for transferring a rotational torque, are classified typically into the fixed type joint allowing only angular displacement between the axles and the plunging type joint allowing both angular and axial displacement between the axles. The fixed type constant velocity joint is required to operate with a relatively high operating of, for example, 45θ or more, as compared to the plunging type joint.

FIG. 1 illustrates a conventional fixed type constant velocity joint known as a Rzeppa type constant velocity joint (referred hereinafter as a "Rzeppa joint"). This joint includes an outer race 11 having a spherical inner space formed with a plurality of (e.g., six) outer ball grooves 111, and an inner race 12 with a plurality of (e.g., six) corresponding inner ball grooves 121. A plurality of (e.g., six) torque transmitting balls 13 are received and guided in a respective track defined by a outer ball groove 111 and its corresponding inner ball groove 121, and a cage 14 which has a plurality of (e.g., six) cage windows 141 to hold the balls 13 in a same plane.

In the Rzeppa joint, the ball guide grooves 111 and 121 of the outer and inner races 11 and 12 each have a curved contact surface curved with a radius, and the centers C' and C" of the outer and inner guide grooves 111 and 121 are respectively offset with respect to the spherical joint center C0 of the outer and inner race 13 and 12 by a same distance "f" in opposite directions. The center offset f of outer ball grooves 111 and inner ball grooves 121 is applied to maintain a constant velocity characteristic and accommodate a smooth movement of balls 13 when the outer and inner joints are articulated with respect to each other. Funnel angles θf are defined as the angles between the tangential lines at the ball contact points in the outer ball grooves 111 and inner ball grooves 121 when the joint is in a specific joint operating angle. The funnel angle θf is decided typically by the pitch circle radius (PCR) of the ball and center offset f of outer ball groove 111 and inner ball groove 121. As the ball 13 is pressed in the grooves 111 and 121 with the funnel angle θf present, a resultant axial force F is applied onto the balls, and consequently, against the cage 14 as the contact force. Thus, a selection of center offset f and funnel angle θf becomes an important factor for the determination of the strength and durability of the joints.

FIG. 1(b) illustrates the funnel angle θf of the Rzeppa joint at the operating angle θ. In this structure, the funnel angles θf of upper ball 13u and lower ball 13w are the same, and funnel angles θf are constant within the joint operating angle θ. FIG. 1(c) illustrates the directions of ball contact forces F for each groove in the typical Rzeppa Joint. The forces F1, F2, F3 and F4 have the same direction and a total ball contact force is calculated as a sum of these forces.

FIG. 2 illustrates a typical shape of cage 14 which has cage windows 141, aligned in a common plane to hold the balls 13 in the same plane. In general, the strength or durability of cage 14 in the fixed type joint is determined by the stress on a web area 142 (i.e., the structural area between the two adjacent cage windows CW), in which the web stress is defined as the ball contact force F (present due to the funnel angle θf) per web area 142. In addition, cage web area 142 is determined by the width of cage windows CW, which are designed to have a size to cover the entire ball movement range during assembly (with minimum assembly angle θa present) and also in operation (with a maximum operating angle θ of joint present). Thus, an optimization in the funnel angle θf and ball movement through selection of an appropriate center offset f is required to improve the strength and durability of cage 14.

FIG. 3(a) illustrates the state when the joints are articulated for assembly. In a typical fixed type joint, the maximum ball movement occurs when the ball 13 assembles to the joint, because the operating angle θ is less than the assembly angle θa. The minimum assembly angle θa is defined as the angle when the specific ball diameter DB is less than the clearance δ1 between the edge of cage window 141 and the outer edge of outer race groove 111. Therefore, to reduce the minimum assembly angle θa, a distance Dz from the joint center line L0 to the edge of outer race groove 111 needs to be enlarged.

FIG. 3(b) illustrates movements (Mw) of the balls when the joint is in the minimum assembly angle θa. With a joint angle present, the balls 13 assume different angular positions within the cage 14 depending on the angular position of the particular groove relative to the neutral (reference) plane PA of articulation. In this figure, if the minimum assembly angle θa is increased, the maximum ball movement MW also increases, and consequently, the cage window 141 must also have an increased width CW to obtain the minimum clearance δ2 between ball 13 and a corresponding side of cage web 142, which leads to the reduction of web area 142, and thus, causing the deterioration in strength of cage 14. As such, in a typical design of the fixed type joint, if the center offset f and minimum joint assembly angle θa are reduced, the ball movement Mw can also be reduced.

FIG. 4(a) illustrates another conventional fixed type six-ball constant velocity joint known generally as an "undercut-free joint", in comparison with the conventional Rzeppa joint (with its groove configuration shown with dashed lines). As shown, each ball receiving track of this joint includes a main groove area with the same circular configuration of the circular grooves 111 and 121 of the Rzeppa Joint, however, it further includes an area with a different groove configuration of straight ranges 11u and 12u (in opposite radial locations in the outer and inner grooves of the track as shown in FIG. 4(a)). Thus, the undercut-free joint can increase the maximum operating angle of the joint. In addition, due to the straight ball groove shape 11u, the undercut-free joint (as compared to the Rzeppa joint) has an advantage of lowering the minimum assembly angle θa due to the enlarged clearance δu (as compared to the smaller clearance δz of the Rzeppa as shown in FIG. 4(b)) between the edge of the cage window 141 and the outer edge of the outer groove 111. However, it also has a disadvantage of increasing the ball contact force F onto the cage due to the increase of funnel angle θfu2 on a lower ball 13w as shown in FIG. 4(b), thus, enhancing the risks to deteriorate its strength and durability.

SUMMARY OF THE INVENTION

Accordingly, in view of the drawbacks and disadvantages associated with the conventional joints, the present invention is directed to a fixed type constant velocity joint with reliable construction and suitable strength and durability.

The present invention is also directed to a fixed type constant velocity joint with compact structure, and having suitable strength, durability, and load capacity. The present invention is also directed to provide an improved structure and construction for the fixed type constant velocity joints, which can effectively be applicable to the six-ball type joint, which is presently popular for conventional vehicles, and also to the more energy-efficient joints of eight-ball and ten-ball types, etc., which contain many torque-transmitting balls. The present invention is also directed to provide a novel and improved structure to the fixed type constant velocity joint, which can further provide a suitable and sufficient strength and durability to the ball cage (particularly to the web portions of the cage) which is typically susceptible to damage due to the repeated application of high stresses, in particular, onto the cage windows through plural (i.e., six or more) balls received therein to transmit rotational torque between the joint shafts.

As briefly disclosed above, the structures of the conventional Rzeppa joint and undercut-free joint each have both advantages and disadvantages in view of cage strength or durability. For increasing the cage strength and durability, there are typically two main methods. One method is to reduce the contact force by the reduction of funnel angle, and the other is to increase the cage web area by the reduction of joint assembly angle and maximum ball movement in the cage. In order to accomplish these objectives, the present invention provides the ball groove shape to have a variable funnel angle by providing a composite groove configuration (to be described below in detail) which leads to a reduction in the total funnel angle and the joint assembly angle.

As discussed above, the ball grooves in the Rzeppa joint have a circular shape of constant radius in each inner and outer groove, with the two centers oppositely offset by equal distance (see FIG. 1(a)), and the ball grooves in the undercut-free joint have a combination of a circular groove range (of the Rzeppa joint) and a straight range which is typically referred as undercut-free (see FIG. 4(a)). As a result of the differences in the groove shapes between the two fixed type joints, the funnel angle in the Rzeppa joint is constant for the entire operating angle within the joint angle capacity, but the funnel angle in the undercut-free joint varies for the operating angle (see FIG. 4(b)). In particular, the funnel angle of the undercut-free joint at the straight groove range is increased seriously as the retaining ball approaches to the outer edge of the track grooves, and it causes to increase the contact force F, and thus, results in the reduction in cage strength and durability. However, as compared with the straight groove of undercut Joint, the single circular groove shape of the Rzeppa joint has also a disadvantage of limiting the assembly angle of the joint, as described above.

The present invention provides a reduction of joint assembly angle as compared to the Rzeppa joint and a reduction of funnel angle as compared to the undercut-free joint, simultaneously, by the ball groove shape which is composed essentially of two circles with different center offsets and a tangential line segment between these two circles (as will be described in detail below). An advantage in having the ball groove shape of the invention is that it can provide some flexibility in determining the funnel angle and the joint assembly angle by suitably adjusting the position of two center offsets in the ball grooves.

As several examples for illustrating the principles of the invention with further details, the below disclosed Embodiments 1 to 3 illustrate three different kinds of variable funnel angle grooves according to the slope angle of tangential line groove and the center positions of offset of outer race and inner race. Embodiments 4 and 5 illustrate alternating groove configurations, which are composed of the combination of the groove shape of either the typical Rzeppa or undercut-free Joint, and the groove shape of either one of the embodiments 1 to 3, respectively. Also, Embodiment 6 illustrates other alternating groove configurations, which are composed of the combination of two different groove shapes selected from the groove shapes of Embodiments 1 to 3.

According to one aspect of the present invention, a fixed type constant velocity joint for a drive system of a vehicle comprises: an outer race having an inner spherical surface, and a plurality of guide grooves formed in an axial direction in the inner spherical surface of the outer race; an inner race having an outer spherical surface, and a plurality of guide grooves formed in an axial direction in the outer spherical surface of the inner race, said guide grooves of the outer race and said guide grooves of the inner race together forming a plurality of ball guide tracks; a plurality of balls disposed in the ball guide tracks; and a cage installed between the inner spherical surface of the outer race and the outer spherical surface of the inner race, said cage having a plurality of windows for retaining the balls therein; wherein each of the guide grooves of the outer race is shaped to have a longitudinal cross section formed with two circular regions with different centers, a first circular region disposed at a first lateral side of the outer race and a second circular region disposed at a second lateral side of the outer race, and a linear region tangentially extending between these two circular regions; and wherein each of the guide grooves of the inner race is shaped to have a longitudinal cross section formed with two circular regions with different centers, a first circular region disposed at a first lateral side of the inner race and a second circular region disposed at a second lateral side of the inner race, and a linear region tangentially extending between these two circular regions.

According to one preferred embodiment, the first circular region of the guide grooves of the outer race and the first circular region of the guide grooves of the inner race have a first common center, and the second circular region of the guide grooves of the outer race and the second circular region of the guide grooves of the inner race have a second common center, and wherein the first and second common centers are located symmetrically in opposite sides from a joint center line of the joint, and the linear region tangentially extending between these two circular regions is in parallel alignment with a longitudinal axis of the particular inner or outer race.

According to another preferred embodiment, the first circular region of the guide grooves of the outer race has a first center, the second circular region of the guide grooves of the outer race has a second center, the first circular region of the guide grooves of the inner race has a third center, the second circular region of the guide grooves of the inner race has a fourth center, wherein the first and third centers are located towards the first lateral side, and the second and fourth centers are located towards the second lateral side, and the linear region tangentially extending between these two circular regions is in sloped alignment with a longitudinal axis of the particular inner or outer race.

According to another preferred embodiment, the first circular region of the guide grooves of the outer race has a first center, the second circular region of the guide grooves of the outer race has a second center, the first circular region of the guide grooves of the inner race has a third center, the second circular region of the guide grooves of the inner race has a fourth center, and wherein the first and second centers are located towards the first lateral side, and wherein the third and fourth centers are located towards the second lateral side, and the linear region tangentially extending between these two circular regions is in sloped alignment with a longitudinal axis of the particular inner or outer race.

According to another aspect of the invention, a fixed type constant velocity joint comprises: an outer race having an inner spherical surface, and a plurality of guide grooves formed in an axial direction in the inner spherical surface of the outer race; an inner race having an outer spherical surface, and a plurality of guide grooves formed in an axial direction in the outer spherical surface of the inner race, said guide grooves of the outer race and said guide grooves of the inner race together forming a plurality of ball guide tracks; a plurality of balls disposed in the ball guide tracks; and a cage installed between the inner spherical surface of the outer race and the outer spherical surface of the inner race, said cage having a plurality of windows for retaining the balls therein; wherein the ball guide tracks are shape into two different groove configurations, namely, first tracks with a first groove configuration and second tracks with a second groove configuration; wherein the first and second tracks are arranged around the circumference of the joint in alternate manner one after another; wherein the groove configuration of the first tracks is characterized in that: each of the guide grooves of the outer race is shaped to have a longitudinal cross section formed with two circular regions with different centers, a first circular region disposed at a first lateral side of the outer race and a second circular region disposed at a second lateral side of the outer race, and a linear region tangentially extending between these two circular regions, and each of the guide grooves of the inner race is shaped to have a longitudinal cross section formed with two circular regions with different centers, a first circular region disposed at a first lateral side of the inner race and a second circular region disposed at a second lateral side of the inner race, and a linear region tangentially extending between these two circular regions; wherein the groove configuration of the second tracks is characterized in that: each of the guide grooves of the outer race is shaped to have a longitudinal cross section formed in a first circular shape with a center, and each of the guide grooves of the inner race is shaped to have a longitudinal cross section formed in a second circular shape with a center, the center of the first circular shape and the center of the second circular shape are located symmetrically in opposite sides from a joint center line of the joint.

According to another aspect of the invention, a fixed type constant velocity joint comprises: an outer race having an inner spherical surface, and a plurality of guide grooves formed in an axial direction in the inner spherical surface of the outer race; an inner race having an outer spherical surface, and a plurality of guide grooves formed in an axial direction in the outer spherical surface of the inner race, said guide grooves of the outer race and said guide grooves of the inner race together forming a plurality of ball guide tracks; a plurality of balls disposed in the ball guide tracks; and a cage installed between the inner spherical surface of the outer race and the outer spherical surface of the inner race, said cage having a plurality of windows for retaining the balls therein; wherein the ball guide tracks are shape into two different groove configurations, namely, first tracks with a first groove configuration and second tracks with a second groove configuration; wherein the first and second tracks are arranged around the circumference of the joint in alternate manner one after another; wherein the groove configuration of the first tracks is characterized in that: each of the guide grooves of the outer race is shaped to have a longitudinal cross section formed with two circular regions with different centers, a first circular region disposed at a first lateral side of the outer race and a second circular region disposed at a second lateral side of the outer race, and a linear region tangentially extending between these two circular regions of the outer race; and each of the guide grooves of the inner race is shaped to have a longitudinal cross section formed with two circular regions with different centers, a first circular region disposed at a first lateral side of the inner race and a second circular region disposed at a second lateral side of the inner race, and a linear region tangentially extending between these two circular regions of the inner race; wherein the groove configuration of the second tracks is characterized in that: each of the guide grooves of the outer race is shaped to have a longitudinal cross section formed with a first circular shape with a center and a undercut-free shape at an open end side of the outer race, and each of the guide grooves of the inner race is shaped to have a longitudinal cross section formed with a second circular shape with a center and a undercut-free shape at an open end side of the inner race at opposite side from the undercut-free region of the outer race, the center of the first circular shape and the center of the second circular shape are located symmetrically in opposite sides from a joint center line of the joint.

According to another aspect of the invention, the preferred embodiments of the invention as summarized above and to be described below in details can be combined to provide a joint with two different types of tracks arranged alternately around the circumference of the joint, for example, first set of tracks having the configuration of embodiment 1, 2, or 3, and second set of tracks having the groove configuration of the Rzeppa or undercut-free joint, for another example, first set of tracks having one configuration (for example, embodiment 1), and second set of tracks having a different configuration selected from other embodiments (for example, embodiment 2 or 3).

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Figure 1A:
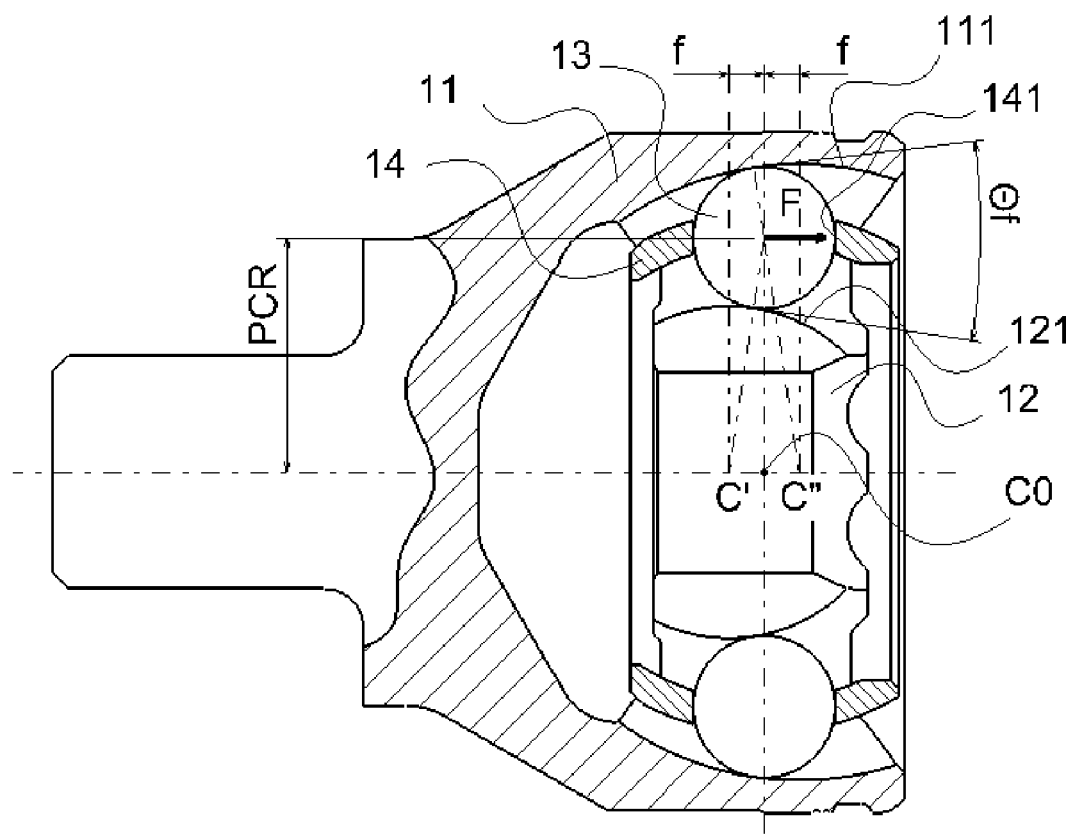
FIGS. 1(a) to 1(c) are cross-sectional views illustrating a conventional fixed type constant velocity joint known as the Rzeppa joint.
Figure 1B:
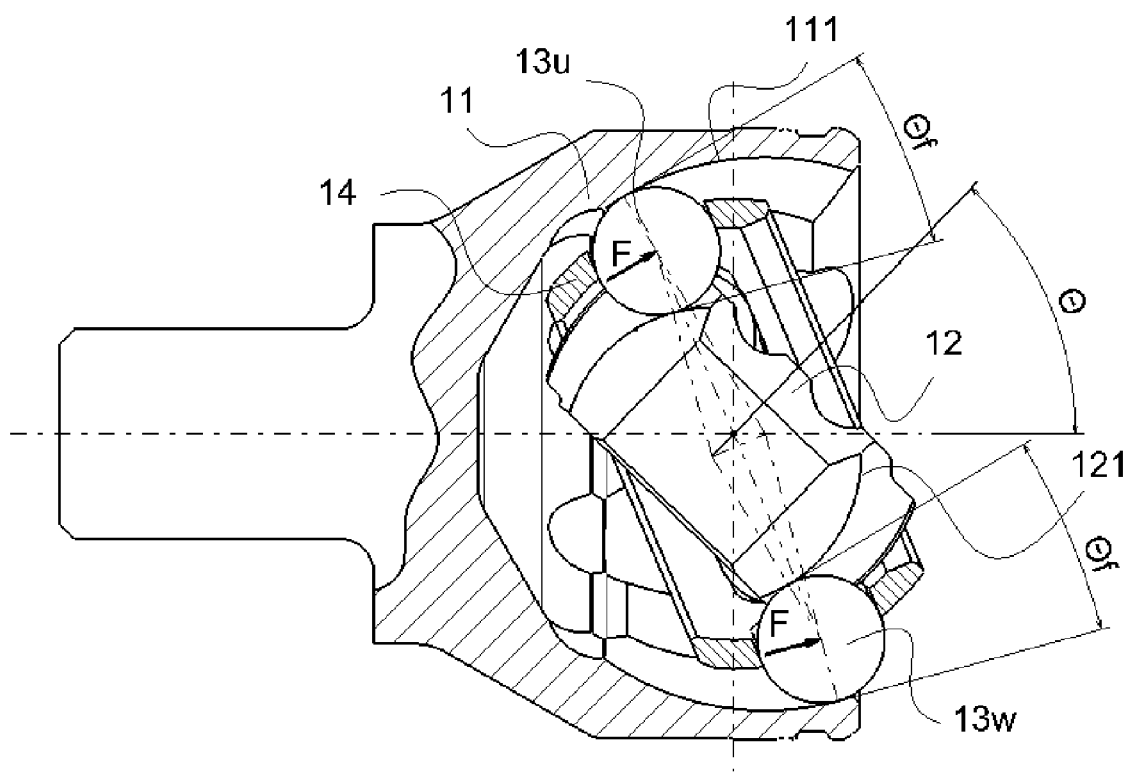
Figure 1C:
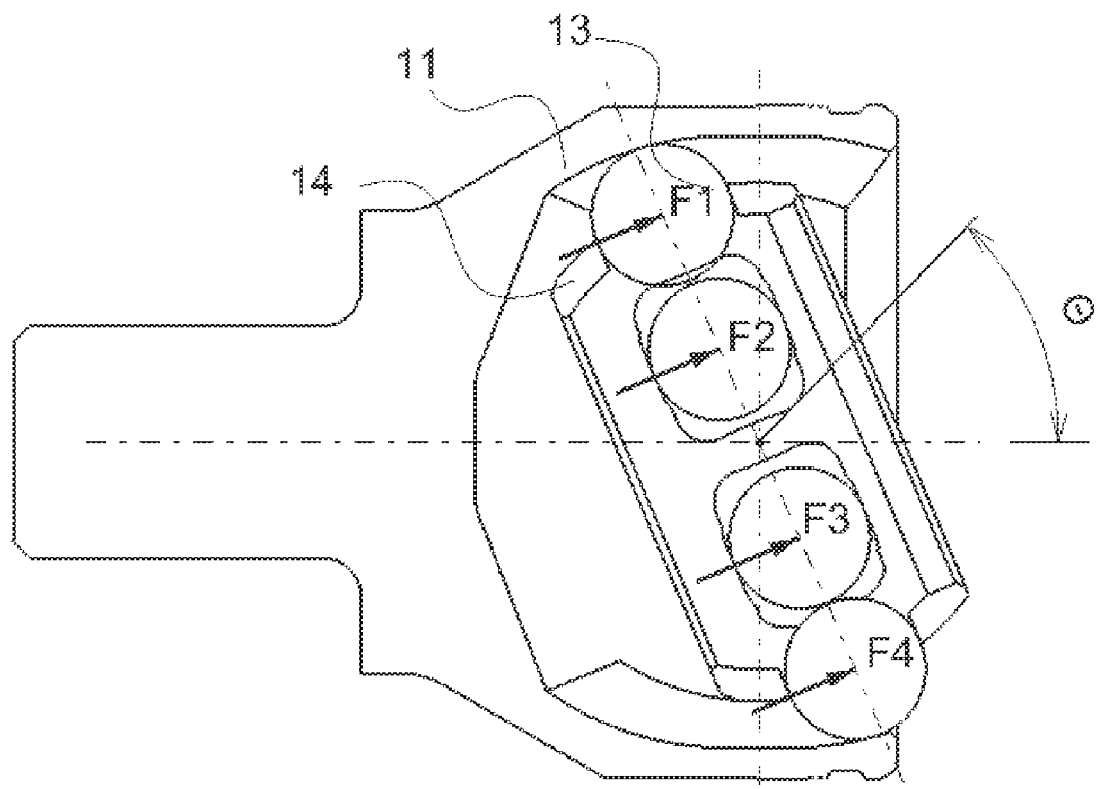
Figure 2:
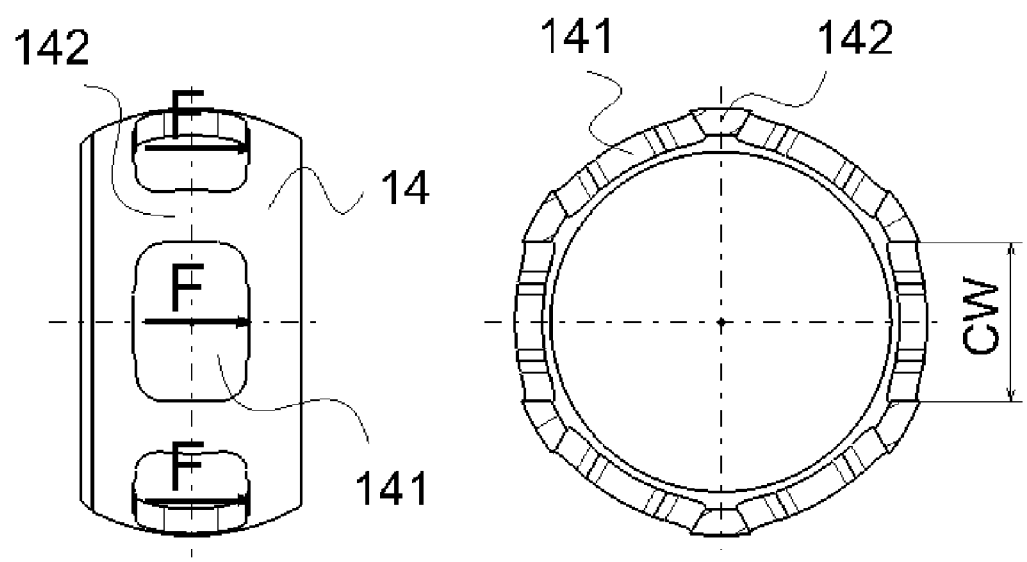
FIG. 2 illustrates a typical shape of a ball cage with six windows for retaining six balls therein.
Figure 3A:
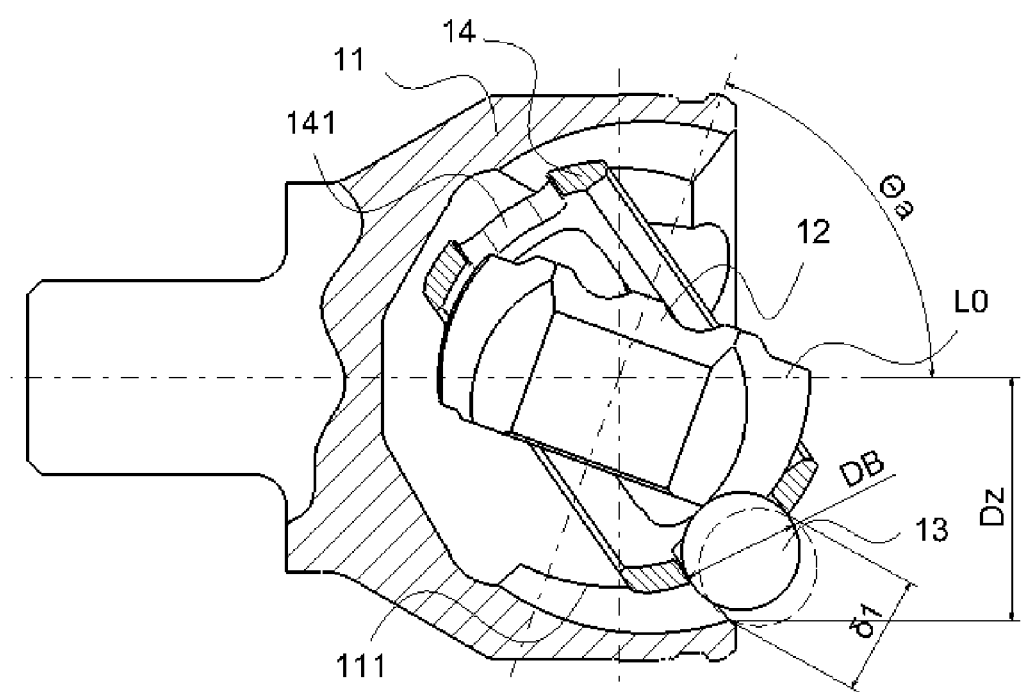
FIG. 3(a) is a cross-sectional view illustrating the state when the joint is articulated for assembling.
Figure 3B:
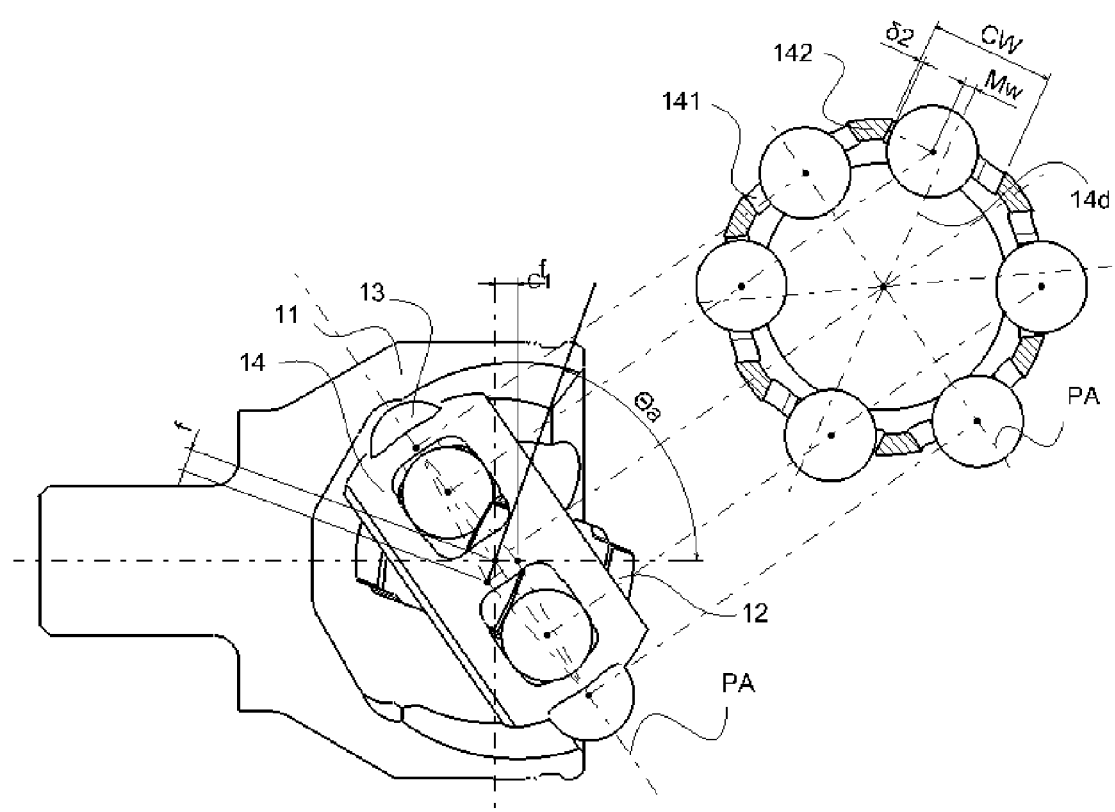
FIG. 3(b) are cross-sectional views illustrating movements of the balls in the cage of six ball type joint.
Figure 4A:
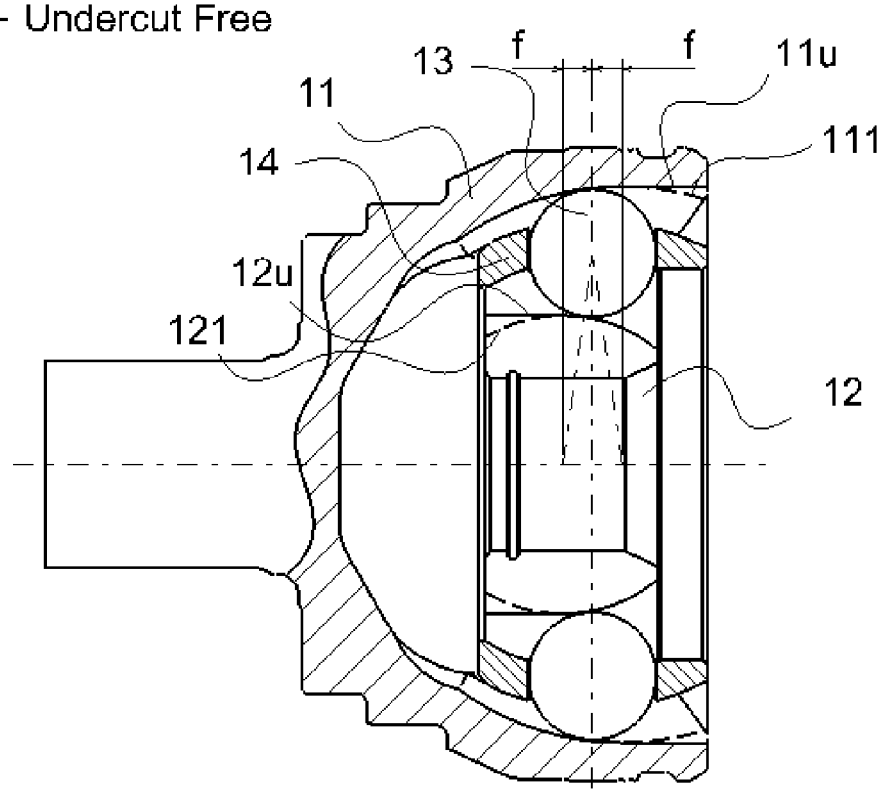
FIGS. 4(a) and 4(b) are cross-sectional views illustrating a conventional fixed type joint known as the undercut-free joint in comparison with the Rzeppa joint.
Figure 4B:
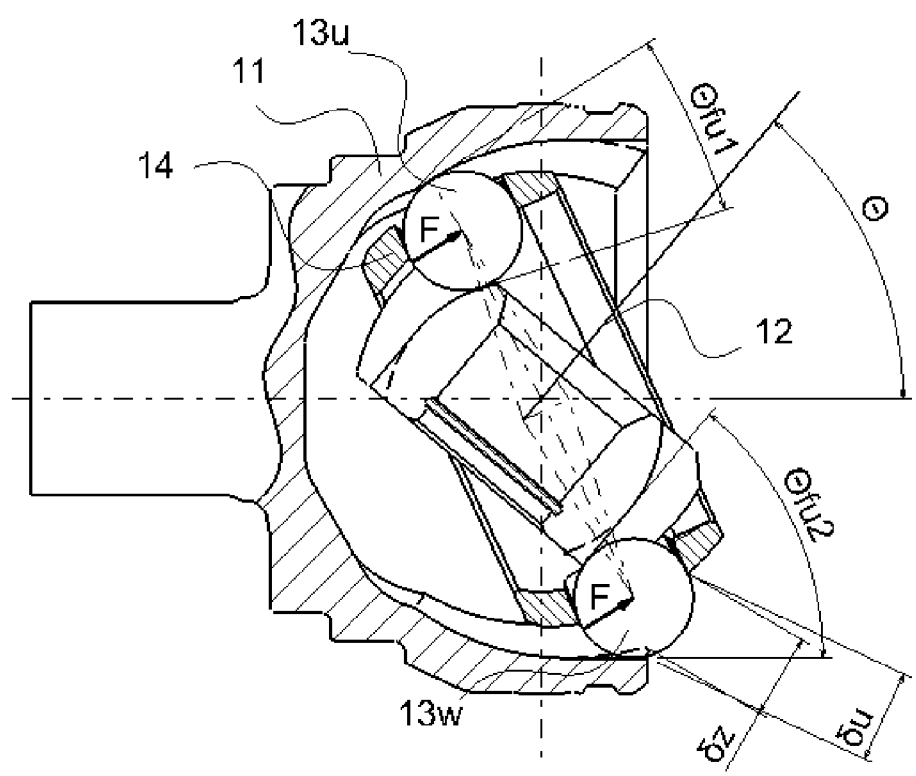

With reference to the accompanied drawings, the fixed type constant velocity joints of the present invention are described herein in further details in connection with several exemplary or preferred embodiments thereof by way of examples of the invention. However, the following descriptions of such embodiments are intended primarily for illustrating the principles and exemplary or presently preferred constructions of the fixed type constant velocity joints, and the present invention is not specifically limited to these exemplary or preferred embodiments as disclosed. Thus, one skilled in the art can appreciate or recognize that various modifications and substitutions can be made thereto without departing from the spirit and scope of the present invention.

In the following description of the invention described in association with several exemplary embodiments thereof, the same or substantially similar parts or portions thereof are referred with the same reference numerals for simplicity purposes.

Embodiment 1

Figure 5A:
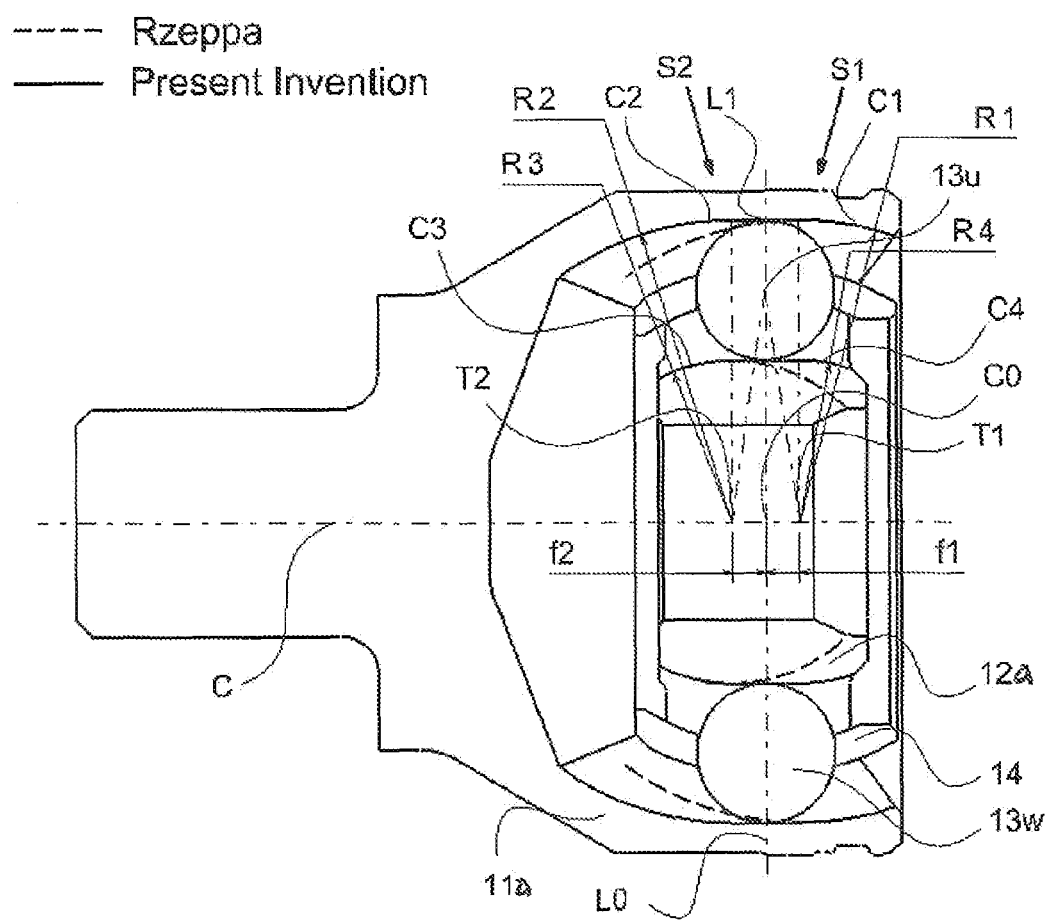
FIGS. 5(a) to 5(c) are cross-sectional views illustrating the fixed type joint constructed according to a first preferred embodiment of the present invention.
Figure 5B:
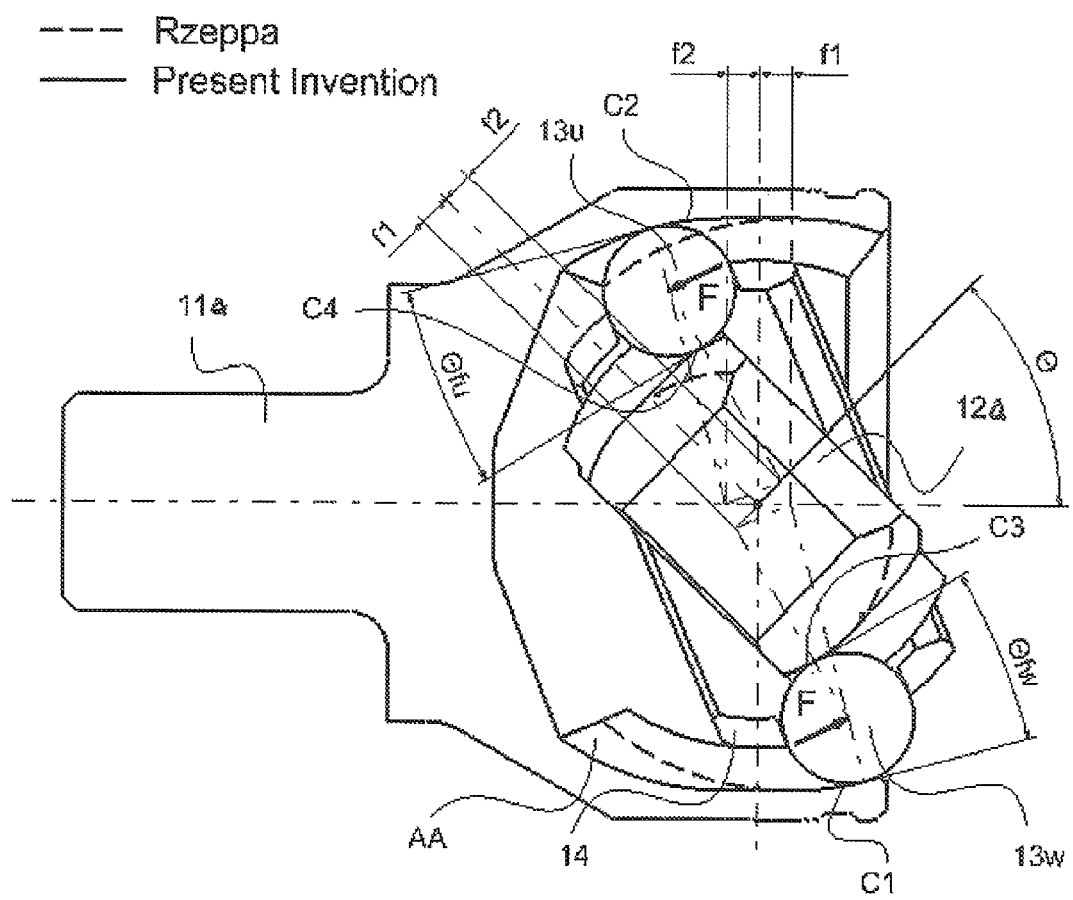
Figure 5C:
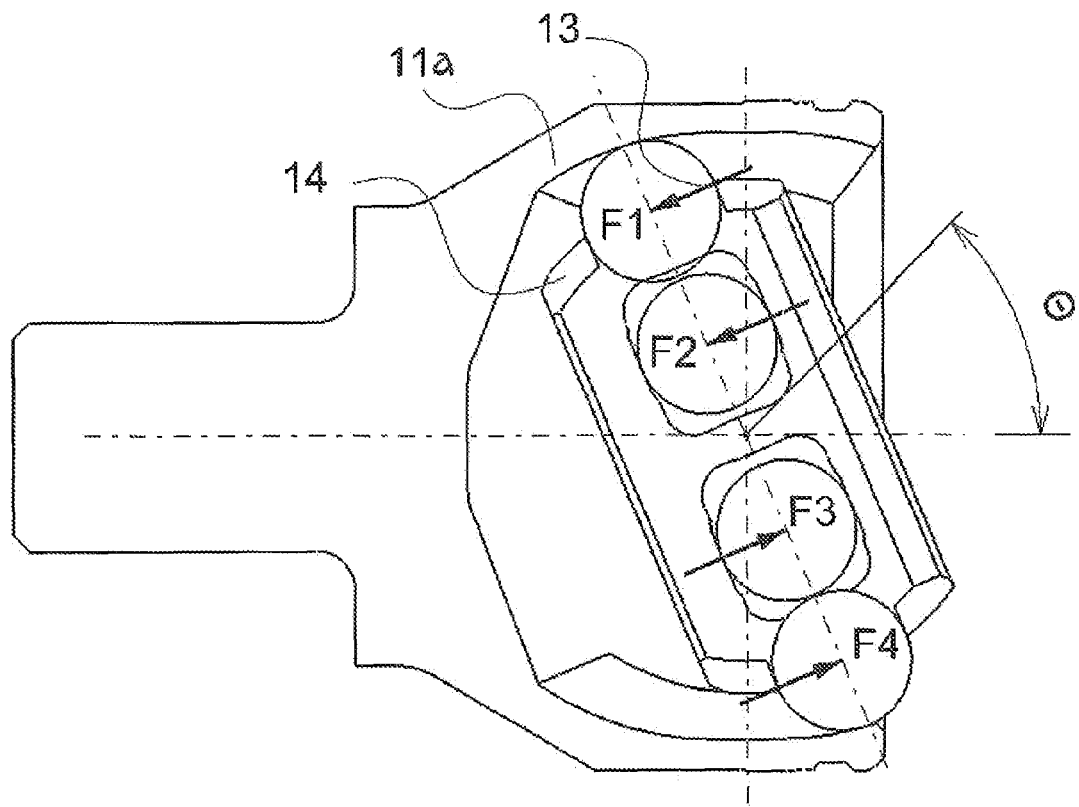

With reference to FIGS. 5(a)-5(c), the first embodiment of the invention is described herein. As illustrated in FIG. 5(a), a fixed type constant velocity joint of this embodiment includes a plurality of (namely, six, eight, or more) ball guiding tracks each defined by a pair of corresponding inner and outer ball grooves. The ball grooves define variable funnel angles therein, and the cross sectional shape of each groove is composed essentially of two circular regions with different centers (thus, in offsets) and an intermediate linear segment connecting tangentially between the two circles. As mention above, the funnel angle is defined as the angles between the tangential lines at the ball contact points in the outer ball grooves and inner ball grooves when the joint is in a specific joint operating angle.

As shown in FIG. 5(a), the ball groove of outer race 11a includes circular region C1 (i.e., a first circular region) disposed at a first lateral side S1 (or right side in the figure) with radius R1 and center T1, circular region C2 (i.e., a second circular region) disposed at a second lateral side S2 (or left side in the figure) with radius R2 and center T2, and linear region L1 extends tangentially between the two circular regions C1 and C2. Likewise, the ball groove of inner race 12a consists of circular region C3 (i.e., a second circular region) disposed at a second lateral side S2 (or left side in the figure) with radius R3 and center T2, circular region C4 (i.e., a first circular region) disposed at a first lateral side S1 (or right side) with radius R4 and center T1, and linear region L2 connects tangentially to the both circles C3 and C4.

In this structure, balls 13 move via the pairs of track grooves C1 and C3, C2 and C4, and L1 and L2 for any joint angle, and cage 14 is guided by outer race 11a and inner race 12a, as illustrated in FIGS. 5(a) and 5(b). When each offset f1 and f2 are defined as the distance from the joint center C0 to the common centers T1 and T2 of the circular regions C1-C4, respectively, f1 and f2 have a same distance from the joint center line L0 and disposed symmetrically at the opposite location there-from in order to accommodate the constant velocity characteristic. As a result, in this embodiment the linear segment extends horizontally, namely, in parallel relation with a longitudinal axis C of the particular inner or outer race, as shown.

With reference to FIGS. 5(b) and 5(c), the advantage of the groove shape of this embodiment is described herein. First advantage can be explained with the portion AA. In the portion AA, as compared to the groove of the conventional Rzeppa and undercut-free joints described above, the inventive groove shape of outer race 11a can accommodate an improved durability and strength due to the enlarged groove thickness. Second advantage of the inventive groove shape is the change in funnel angle direction, in particular, at the upper ball 13u having funnel angle θfu with reversed direction as shown in FIG. 5(b). Contrary to the conventional joints having the funnel angles for the upper ball 13u and the lower ball 13w in the same direction, the present invention provides reversed funnel angles at the upper ball 13u in the inner groove area, which are oriented or open in an opposite direction to the lower ball 13w due to the shape of the grooves (namely, having two circular regions with opposite offset f1 and f2 connected by the intermediate linear groove portions L1 and L2 on each of the outer race 11a and inner race 12a). FIG. 5(c) illustrates the directions of ball contact forces F1, F2, F3, and F4 oriented differently by the funnel angles of the respective ball in the six ball structure, constructed according to this embodiment of the invention with variable funnel angle. In this structure, the total ball contact force can advantageously be reduced because the directions of ball contact forces for three upper balls are opposite to those of three lower balls.

Embodiment 2

With reference to FIGS. 6(a)-6(d), the second embodiment of the invention is described herein, directed to another application of the variable funnel angle groove structure of the invention, one example of which described above in connection with the first embodiment. This embodiment includes common aspects with the first embodiment, however, having certain differences as described below.

Figure 6A:
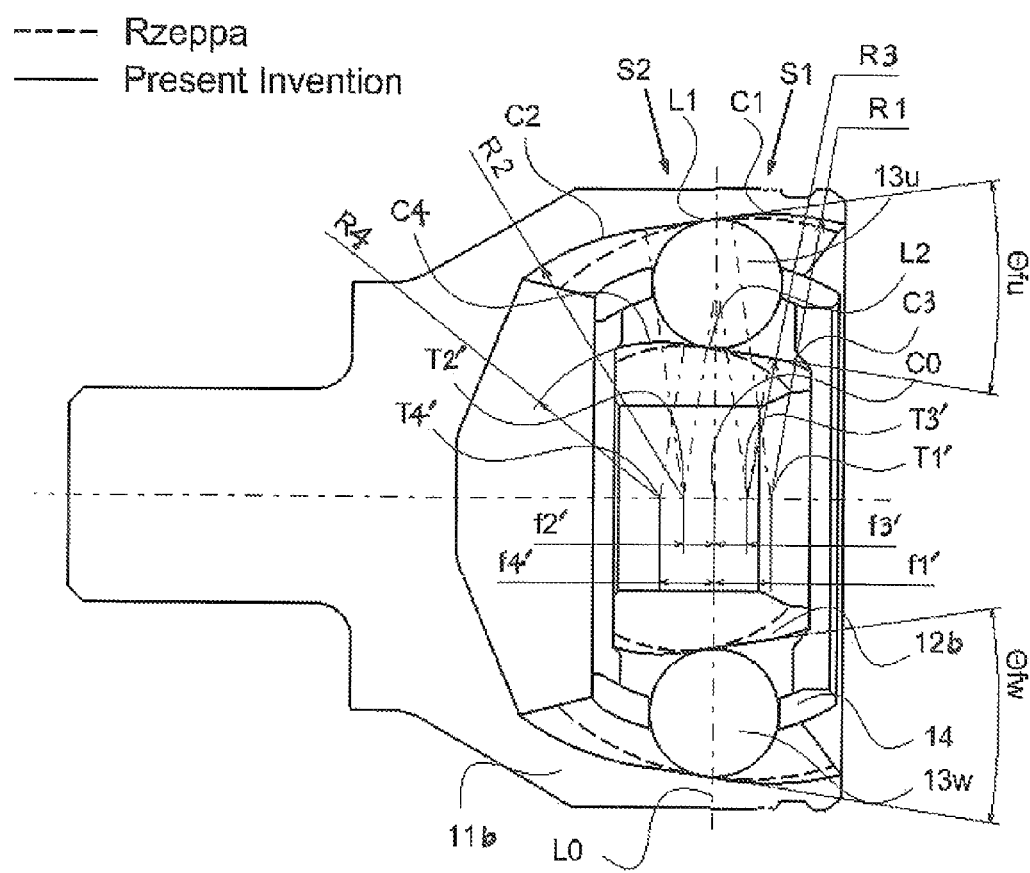
FIGS. 6(a) to 6(d) are cross-sectional views illustrating the fixed type joint constructed according to a second preferred embodiment of the present invention.
Figure 6B:
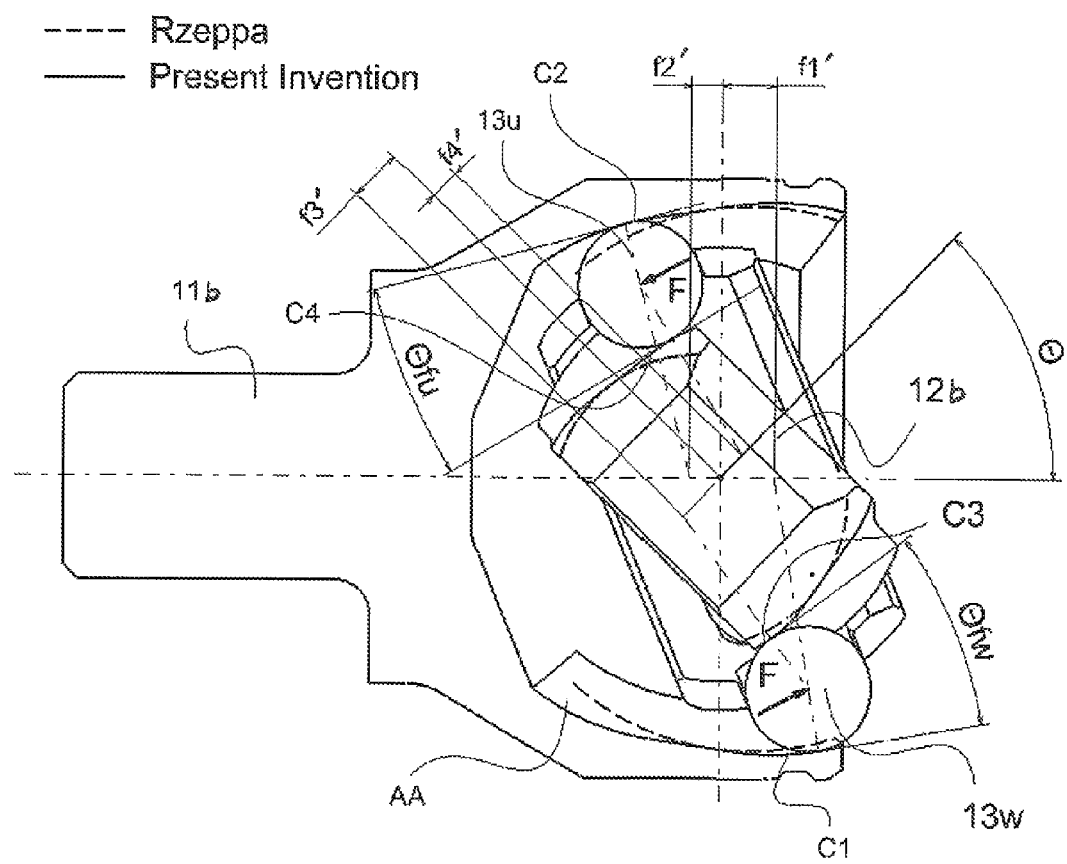

While the groove shape shown in the first embodiment (i.e., FIG. 5) has the horizontally-formed groove region for linear portion (L1), the present embodiment as illustrated in FIG. 6(a) provides an inclined linear groove region. In this structure, the ball groove of outer race 11b includes circular region C1 (i.e., a first or right side circular region) with radius R1 and center T1', circular region C2 (i.e., a second or left side circular region) with radius R2 and center T2', and the linear region L1 connecting and extending tangentially between the two circular regions C1 and C2. Likewise, the ball groove of inner race 12b includes circular region C3 (i.e., a first or right circular region) with radius R3 and center T3', circular region C4 (i.e., a second or left circular region) with radius R4 and center T4', and linear region L2 tangentially extending between the two circular regions C3 and C4. In this structure, balls 13 move via the pairs of grooves C1 and C3, C2 and C4, and L1 and L2 for the any joint angle, and cage 14 is guided by the outer race 11b and inner race 12b, as illustrated in FIGS. 6(a) and 6(b). When each offset f1', f2', f3' and f4' are defined as the distance from the joint center C0 to each center T1', T2', T3' and T4', respectively, the offsets f1' and f4', and the offsets f2' and f3' as well, have a same distance from the joint center line L0 and disposed symmetrically at the opposite location there-from in order to accommodate the constant velocity characteristic of the joint.

Figure 6C:
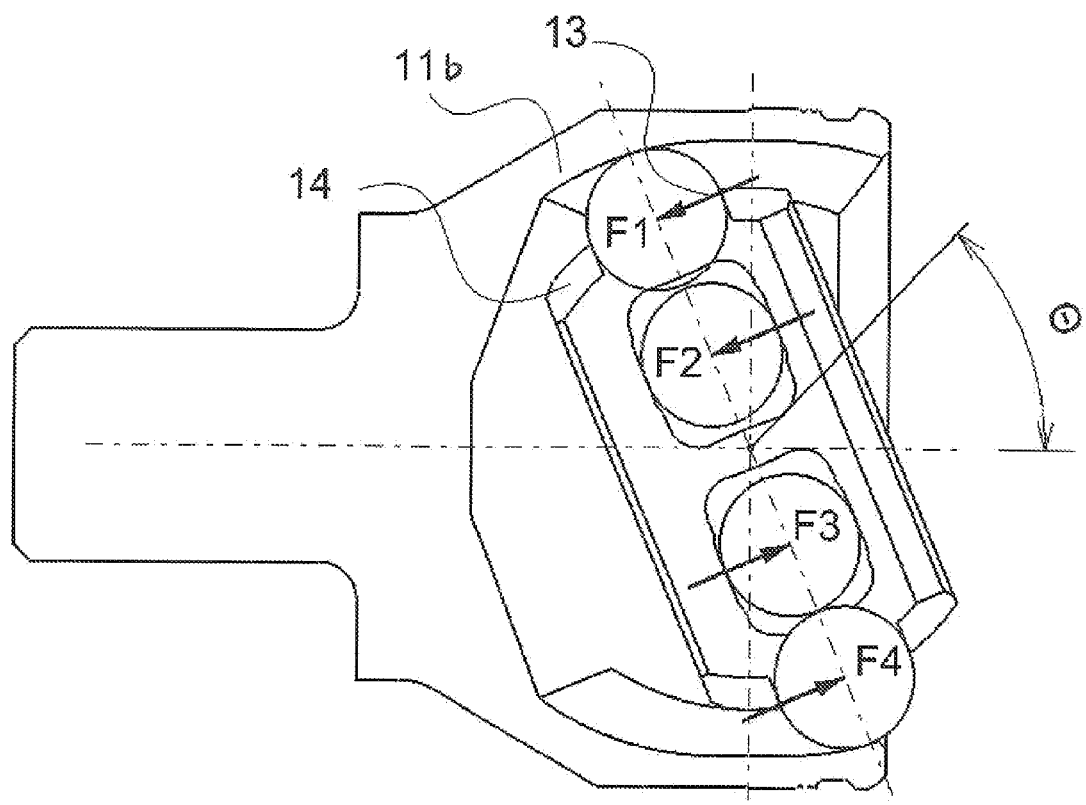
Figure 6D:
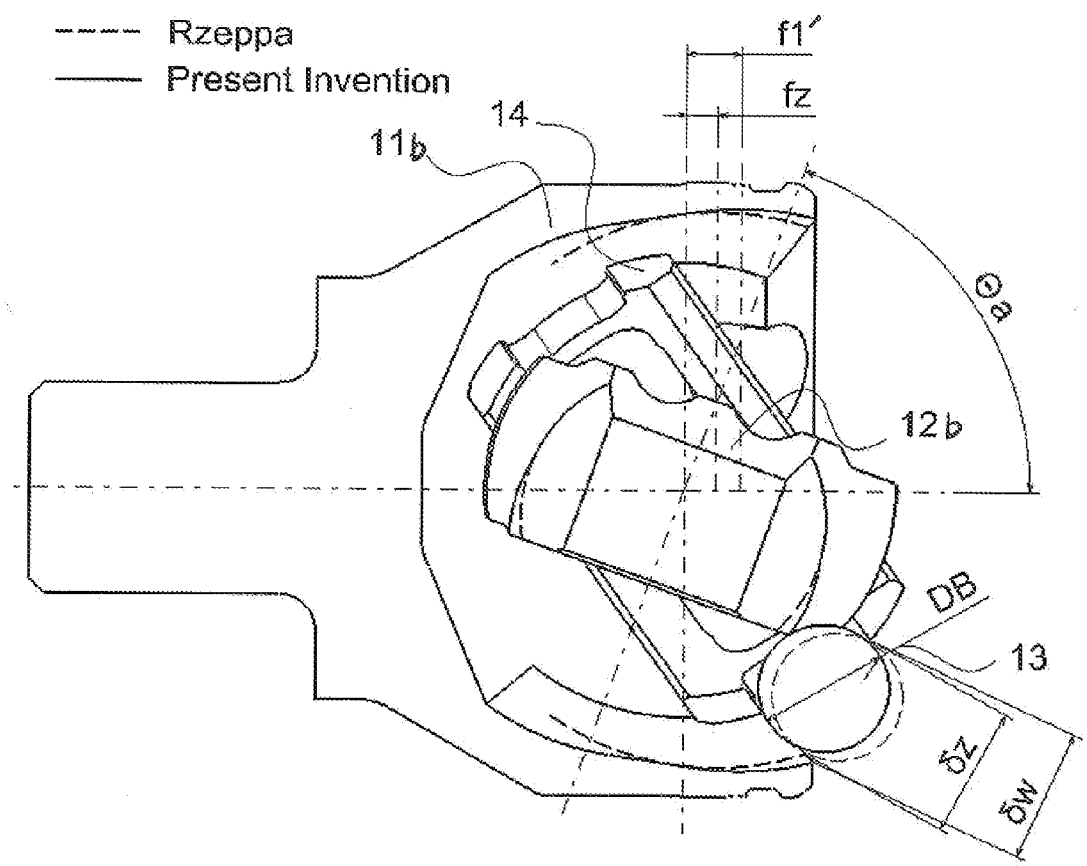
Figure 7A:
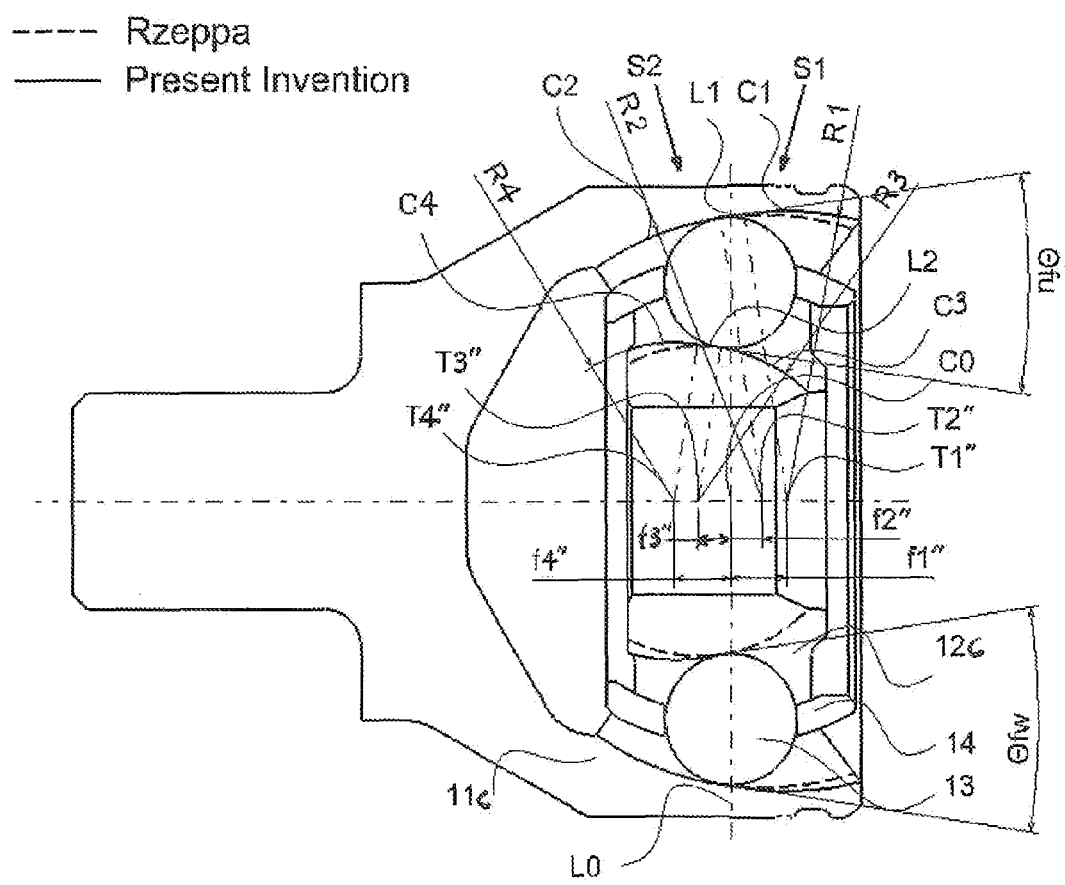
FIGS. 7(a) to 7(d) are cross-sectional views illustrating the fixed type joint constructed according to a third preferred embodiment of the present invention.
Figure 7B:
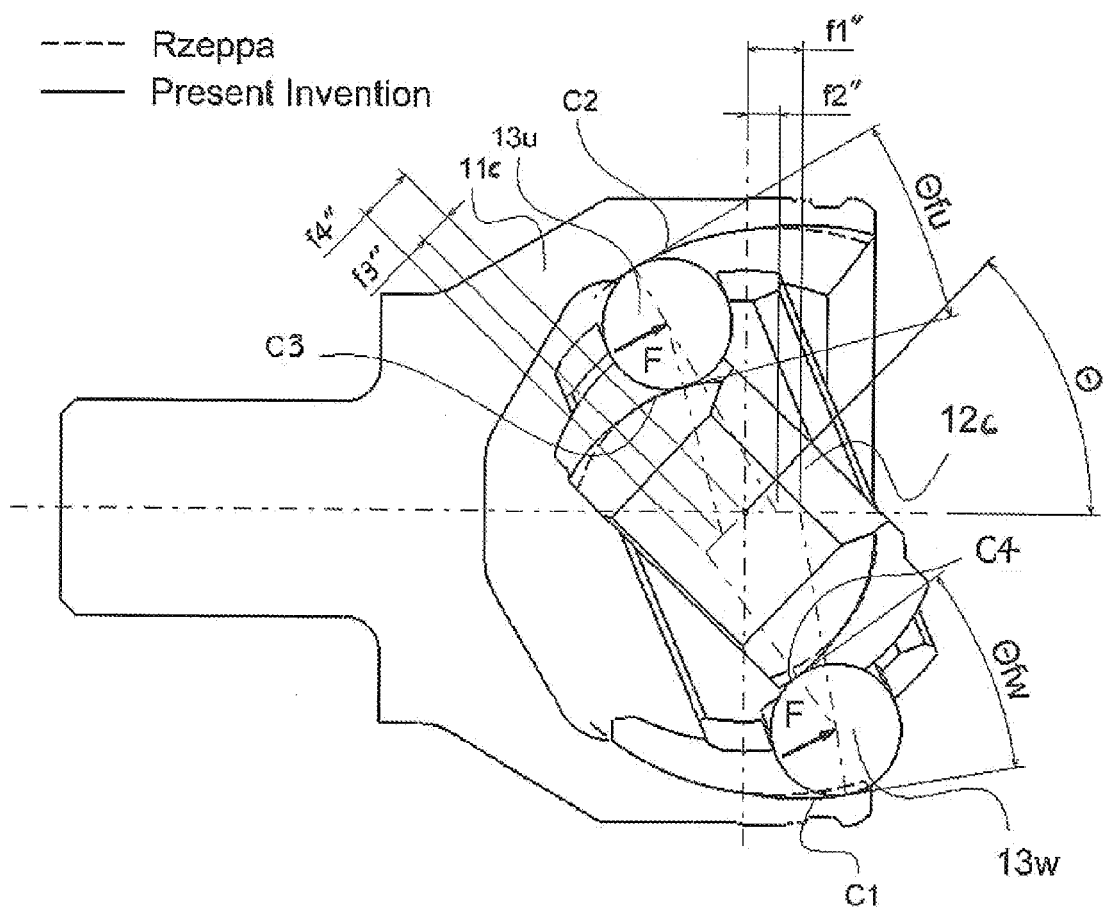
Figure 7C:
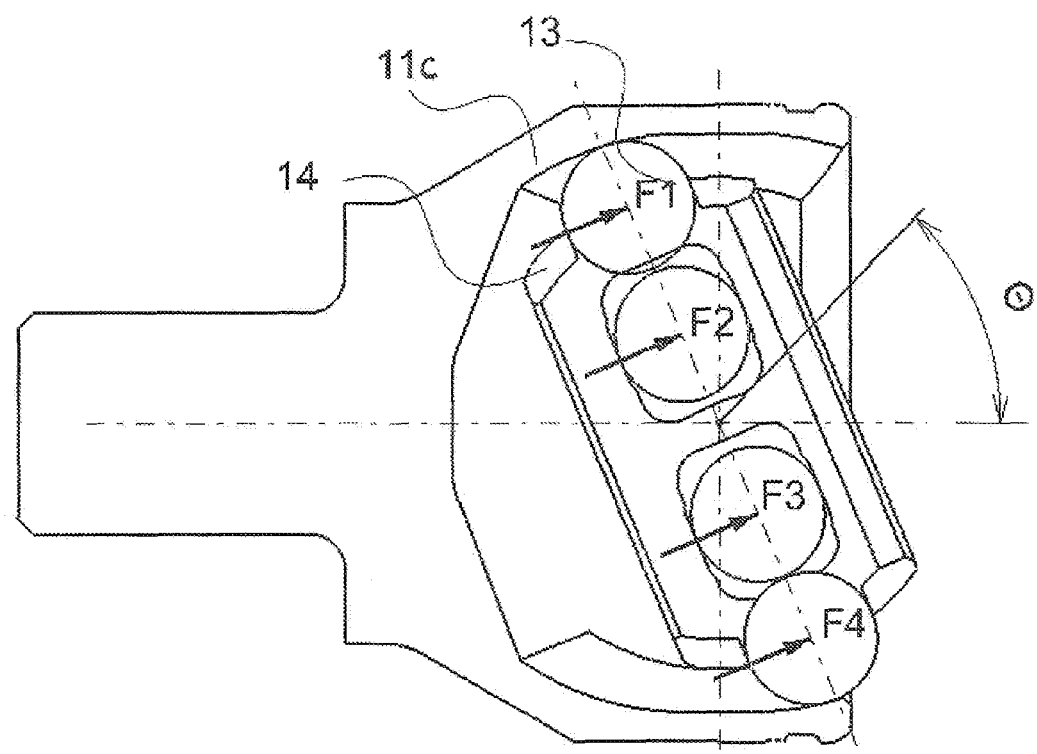
Figure 7D:
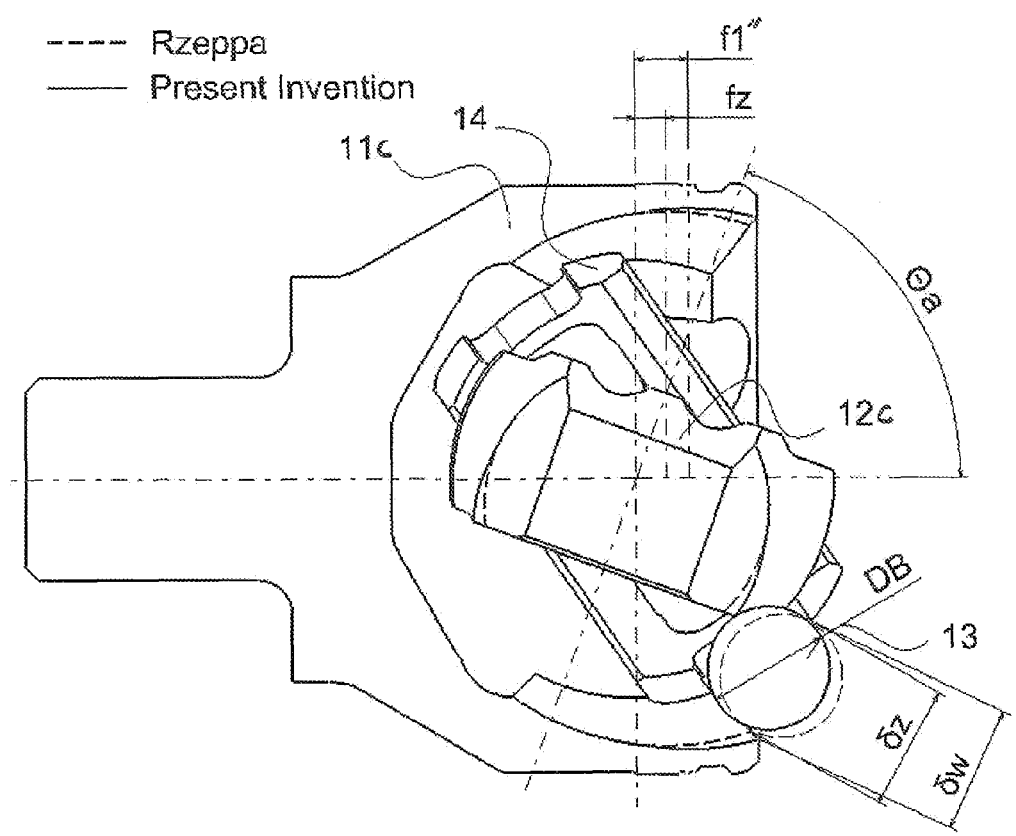
Figure 8A:
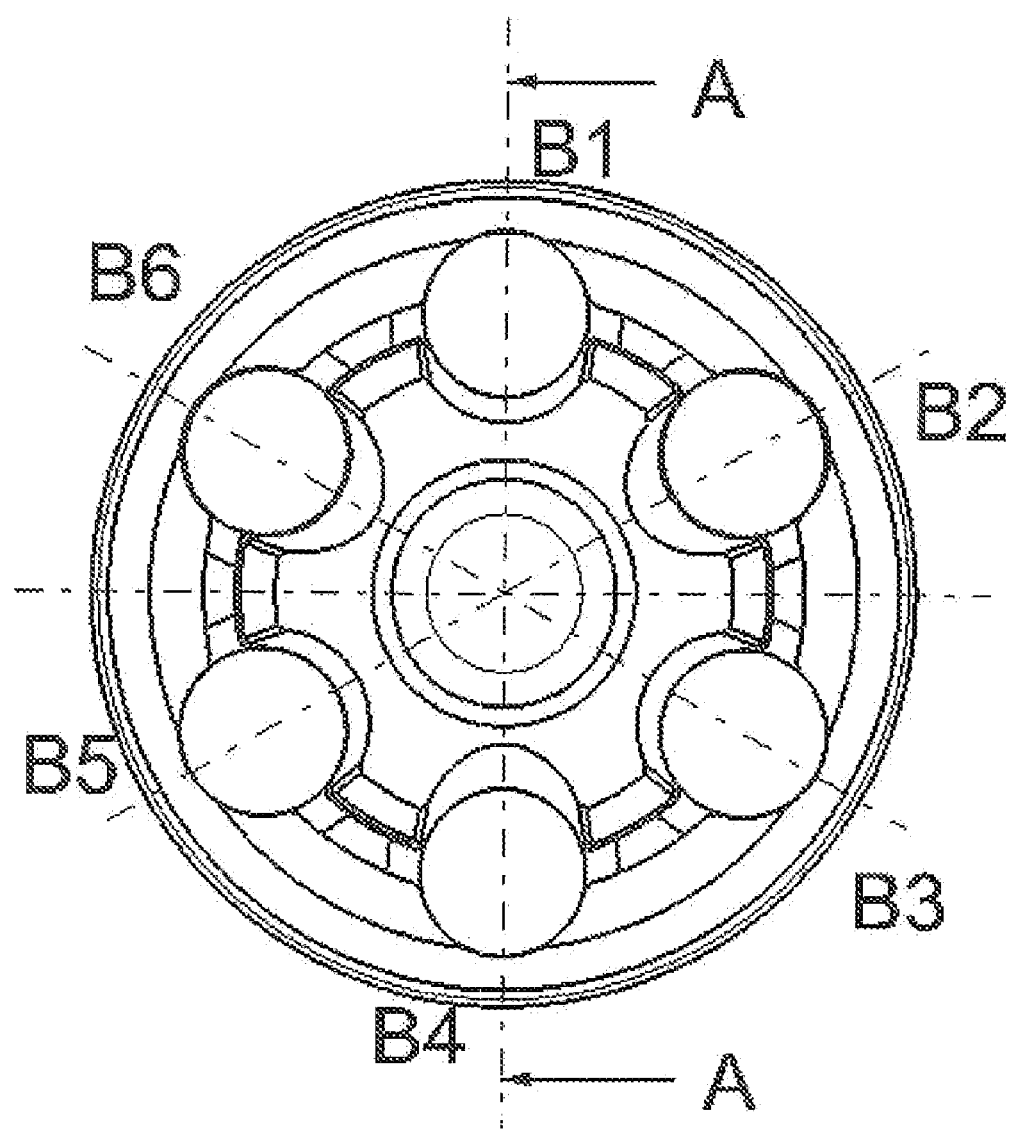
FIGS. 8(a) to 8(i) are cross-sectional views illustrating the fixed type joints constructed according to a fourth preferred embodiment of the present invention.
Figure 8B:
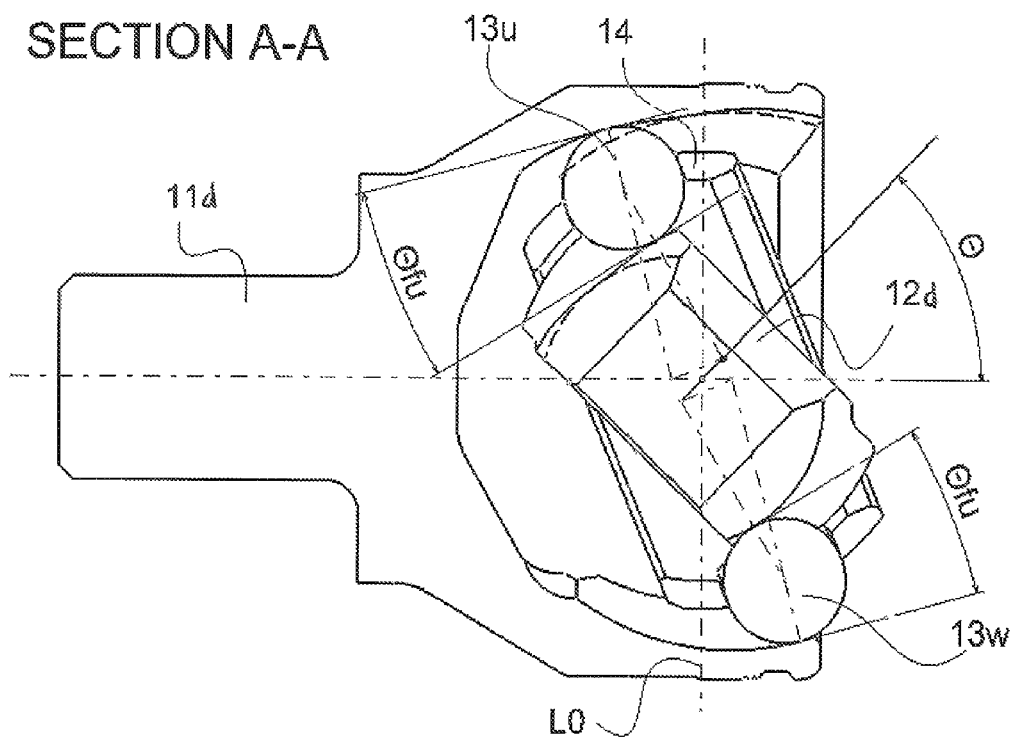
Figure 8C:
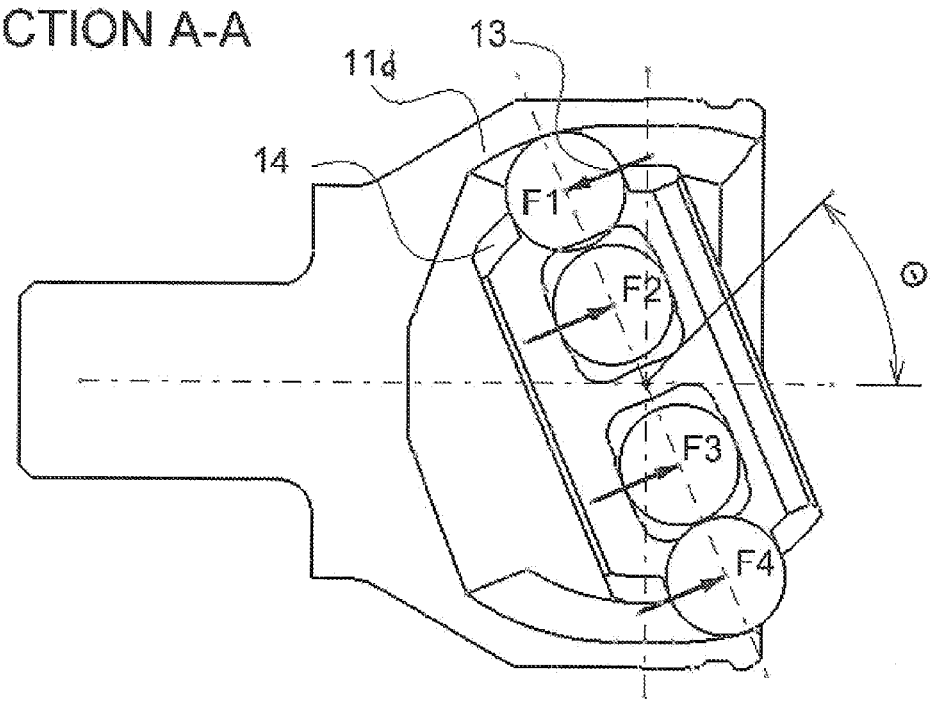
Figure 8D:
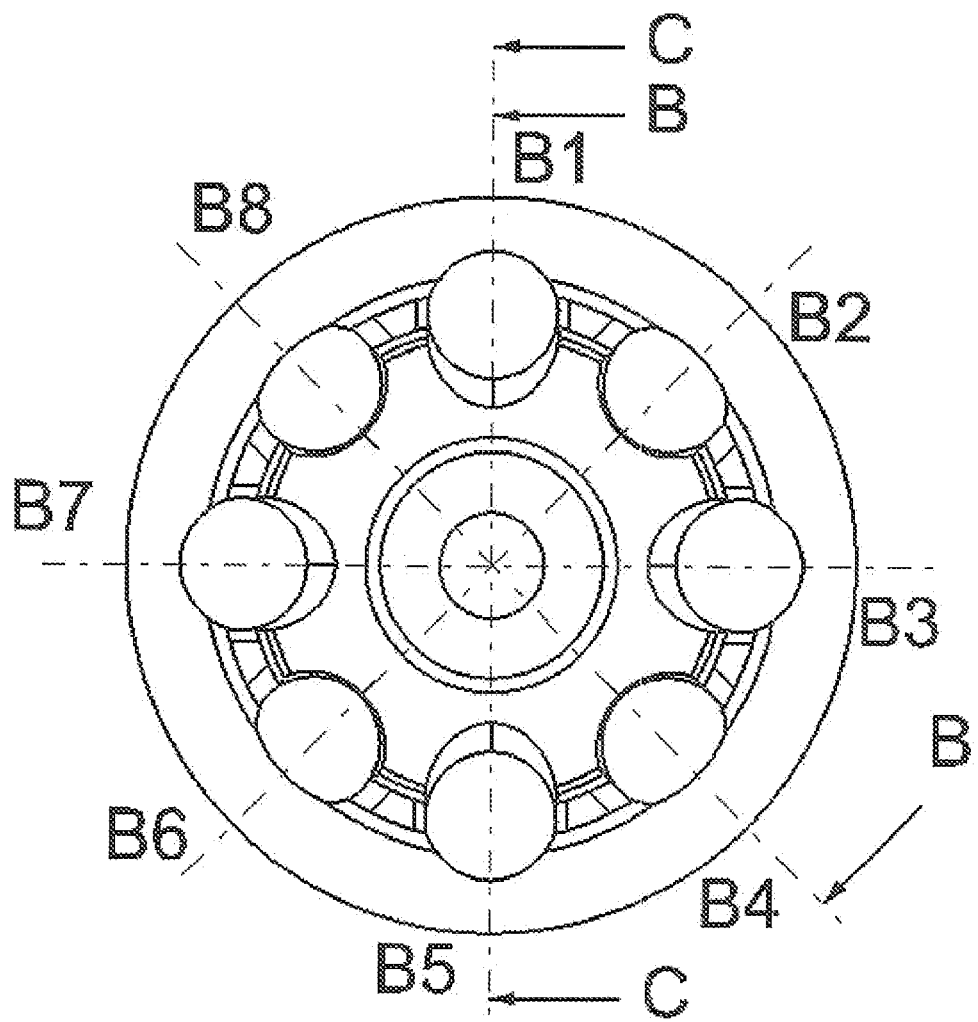
Figure 8E:
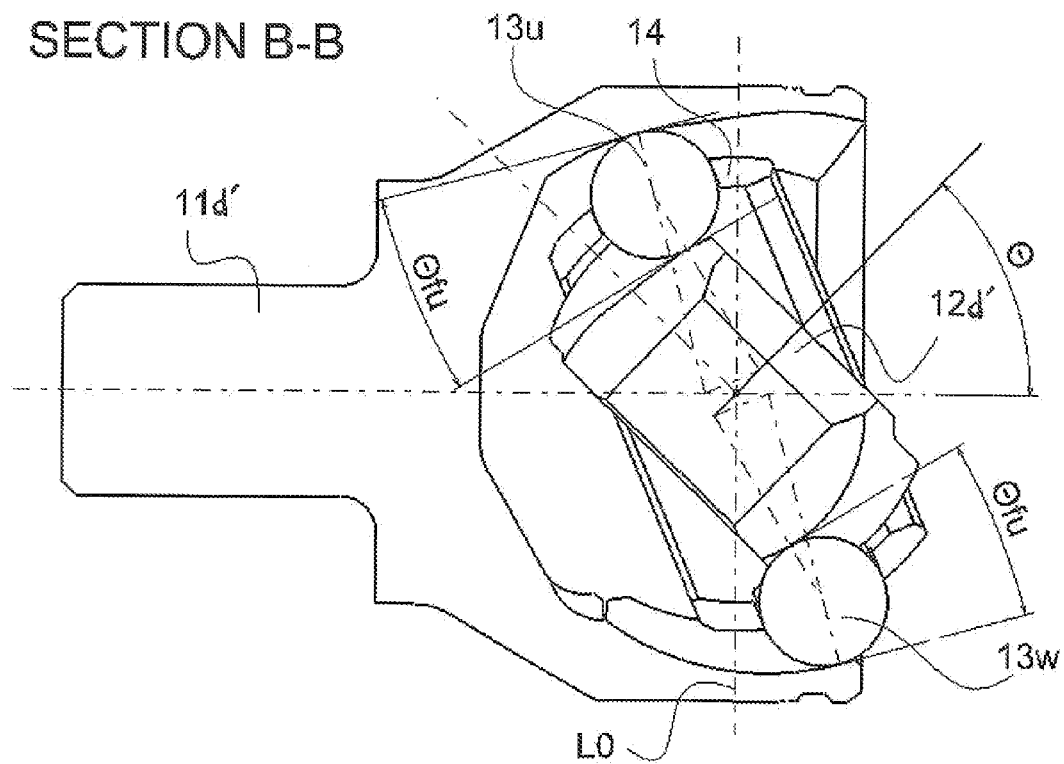
Figure 8F:
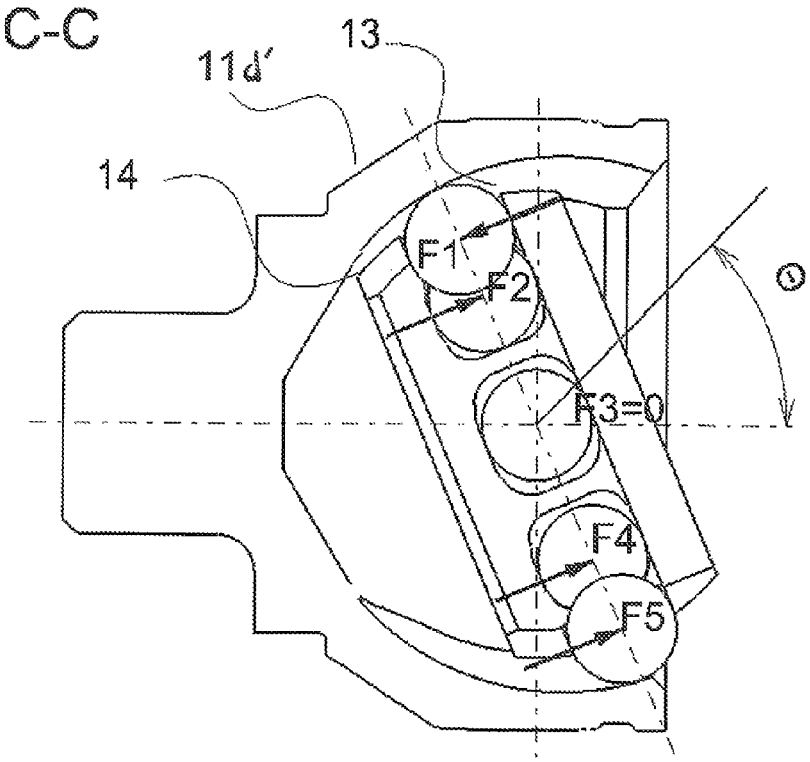
Figure 8G:
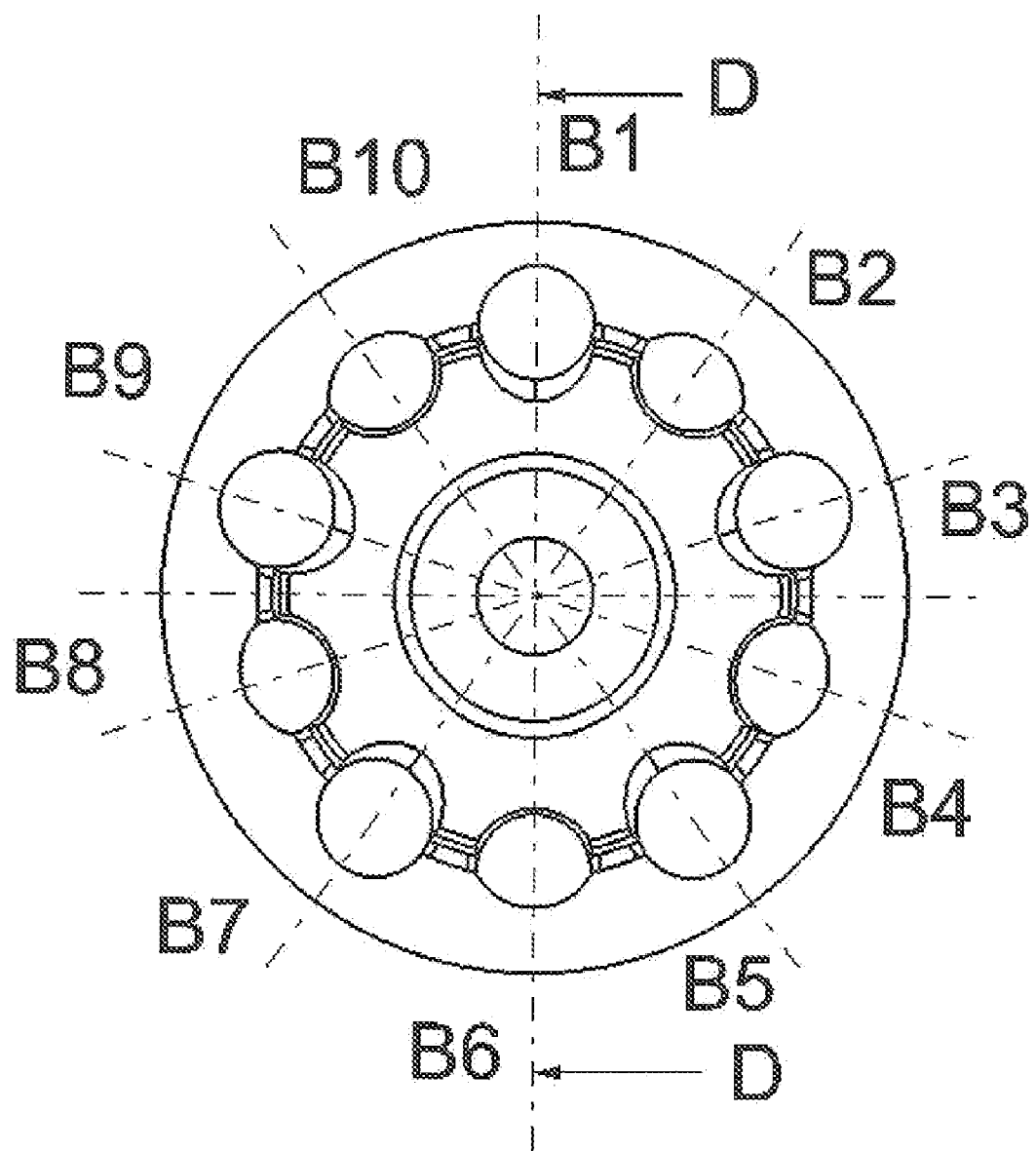
Figure 8H:
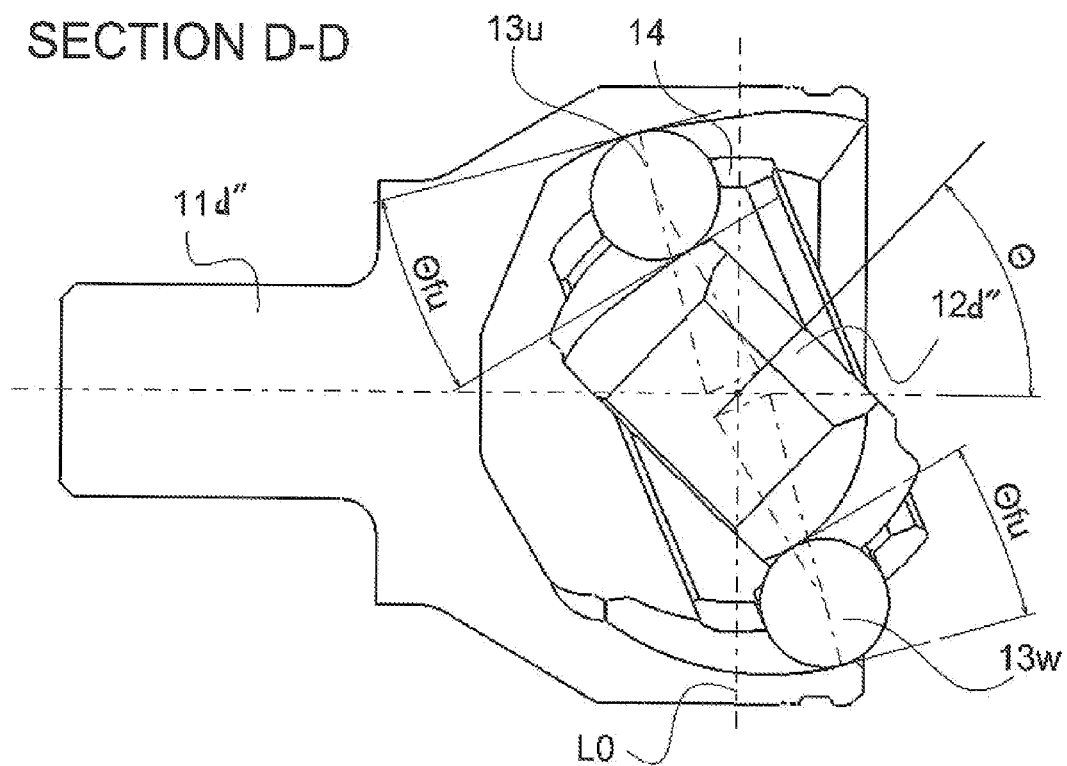
Figure 8I:
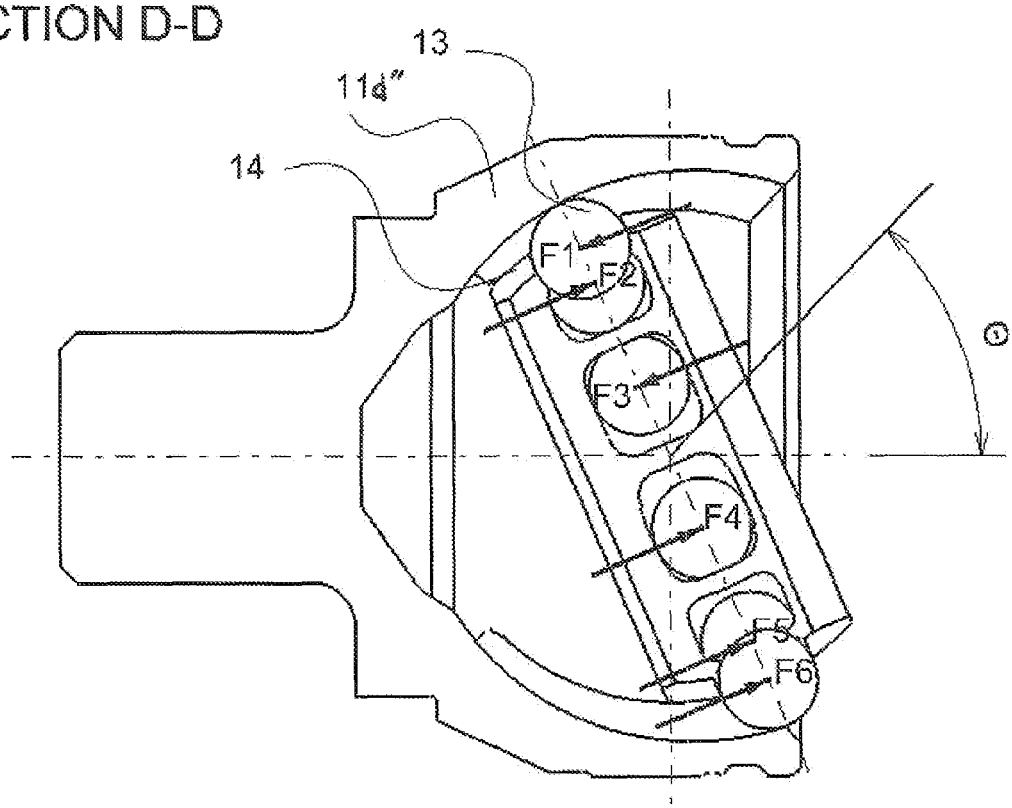

With reference to FIG. 6(b)-6(d), the advantages of the groove shape of this embodiment that are basically similar to the first embodiment as described above although the configuration of the grooves have some difference as discussed above. Like the first embodiment, a first advantage can be explained with the portion AA. In the portion AA, as compared to the groove of the conventional Rzeppa and undercut-free joints described above, the inventive groove shape of outer race 11*b* and inner race 12*b* can accommodate an improved durability and strength due to the enlarged groove thickness. Similar to the first embodiment, another advantage of the inventive groove shape is due to the change in the funnel angle direction, in particular, at the upper ball 13*u* having funnel angle θfu with reversed direction as shown in FIG. 6(*b*). Contrary to the conventional joints having the funnel angles for the upper ball 13*u* and the lower ball 13*w* in the same direction, the present invention provides reversed funnel angles at the upper ball 13*u* in the inner groove area, which are oriented or open in an opposite direction to the lower ball 13*w* due to the shape of the grooves as described above. FIG. 6(*c*) illustrates the directions of ball contact forces F1, F2, F3, and F4 oriented differently by the funnel angles of the respective ball in the six ball structure, according to the present embodiment of the invention with variable funnel angle. In this structure, the total ball contact force can advantageously be reduced because the directions of ball contact forces for three upper balls are opposite to those of three lower balls. In addition, as illustrated in FIG. 6(*d*), this structure has an advantage of reducing the minimum assembly angle θa due to the larger clearance δw (as compared to the conventional Rzeppa joint with clearance δz at the minimum assembly angle) between the edge of cage window and the outer edges in the groove of the outer race 11*b*.

Embodiment 3

With reference to FIGS. 7(*a*)-7(*d*), the third embodiment of the invention is described herein, directed to another application of the variable funnel angle groove structure of the invention, examples of which described above in connection with the first and second embodiments. The present embodiment includes common aspects with the second embodiment, however, having certain differences as described below.

Similar to the groove shape of the second embodiment (i.e., FIG. 6), the present embodiment as illustrated in FIG. 7(*a*) provides an inclined or sloped linear groove region L1. However, in this embodiment, center T2″ of circular groove C2 of outer race 11*c* and center T4″ of circular groove C4 of inner race 12*c* are located in the opposite side of the joint center line L0. As illustrated in FIGS. 7(*b*) and 7(*c*), this application does not provide a substantial advantage for the improvement of strength and durability of outer race 11 and inner race 12, as well as, for the reduction of ball contact force because the shapes of circular groove C2 of outer race 11*c* and circular groove C3 of inner race 12*c* are same as the circular groove shapes of the conventional Rzeppa joint. However, as illustrated in FIG. 7(*d*), this structure provides an advantage of reducing the minimum assembly angle θa due to the larger clearance δw (as compared to the conventional Rzeppa joint with clearance δz at the minimum assembly angle) between the edge of cage window and the outer edges in the groove of the outer race 11*c*.

Embodiment 4

With reference to FIGS. 8(*a*)-8(*i*), the fourth embodiment of the invention is described herein, which discloses alternate groove configurations in the groove structure, typically, in combination of the variable funnel angle groove configuration, as described above in connection with first to third embodiments, and the groove configuration of the Rzeppa joint. As such, the present embodiment includes some common aspects with the above described embodiments of the invention, however, the detailed description of which are omitted herein for simplicity purposes.

FIGS. 8(*a*) and 8(*b*) illustrate a six ball, fixed type joint structure of the invention with its outer race 11*d* and inner race 12*d* having the alternate groove configuration, in combination of the typical Rzeppa groove shape in positions B1, B3 and B5, and the groove shape of the above described embodiments (in particular, embodiment 2) in positions B2, B4 and B6, disposed alternately one after another. FIG. 8(*c*) illustrates the ball contact forces F1, F2, F3 and F4 produced due to the funnel angle for the respective groove. This structure can accommodate similar advantages to the embodiment 2, in terms of cage strength and durability by reduction of minimum assembly angle and the total ball contact forces on the cage.

FIGS. 8(*d*) and 8(*e*) illustrate the eight ball type fixed joint structure with its outer race 11*d′* and inner race 12*d′* having the alternate groove configuration of the invention, in combination of the typical Rzeppa groove shape for positions B1, B3, B5 and B7, and the groove shape of the embodiment 2 for positions B2, B4, B6 and B8, disposed alternately one after another. FIG. 8(*f*) illustrates the ball contact forces F1, F2, F3, F4 and F5 produced due to the funnel angle for each respective groove. This structure can accommodate similar advantages to embodiment 2, in terms of cage strength and durability by the reduction of minimum assembly angle and the total ball contact forces on the cage.

FIGS. 8(*g*) and 8(*h*) illustrate the ten ball type fixed joint structure with its outer race 11*d″* and inner race 12*d″* having the alternate groove configuration of the invention, in combination of the typical Rzeppa groove shape for positions B1, B3, B5, B7 and B9, and the groove shapes of embodiment 2 for positions B2, B4, B6, B8 and B10, disposed alternately. FIG. 8(*i*) illustrates the ball contact forces F1, F2, F3, F4, F5 and F6 produced due to the funnel angle configuration for each groove. This structure can accommodate similar advantages to embodiment 2, in terms of cage strength and durability by the reduction of minimum assembly angle and the total ball contact forces on the cage.

In this embodiment as illustrated in connection with FIGS. 8(*a*)-8(*i*), the alternate groove combination is described to have the combination of the typical Rzeppa groove shape and embodiment 2. However, it is particularly noted that this application of alternative groove can be made by the combination of the Rzeppa joint groove and that of embodiment 1 or 3. The details of such alternative configurations are not shown for simplicity purposes.

Embodiment 5

With reference to FIGS. 9(*a*)-9(*i*), the fifth embodiment of the invention is described herein, which discloses another type of alternate groove configurations of the invention, in combination of the variable funnel angle groove configuration, as described above in connection with first to third embodiments, and the groove configuration of the undercut-free joint. As such, the present embodiment includes some common aspects with the above described embodiments of the invention, however, the detailed description of which are omitted herein for simplicity purposes.

FIGS. 9(*a*) and 9(*b*) illustrate a six ball type fixed joint structure of the invention with its outer race 11*e* and inner race 12*e* having the alternate groove configuration, in combination of the typical undercut-free groove shape for positions B1, B3 and B5, and the groove shapes of the above described embodiments (in particular, embodiment 2) for positions B2, B4 and B6, disposed alternatively one after another. FIG. 9(c) illustrates the ball contact forces F1, F2, F3 and F4 produced due to the funnel angle configuration for each groove. This structure can accommodate advantages similar to that of embodiment 2, in terms of cage strength and durability by the reduction of minimum assembly angle and the total ball contact forces on the cage.

Figure 9A:
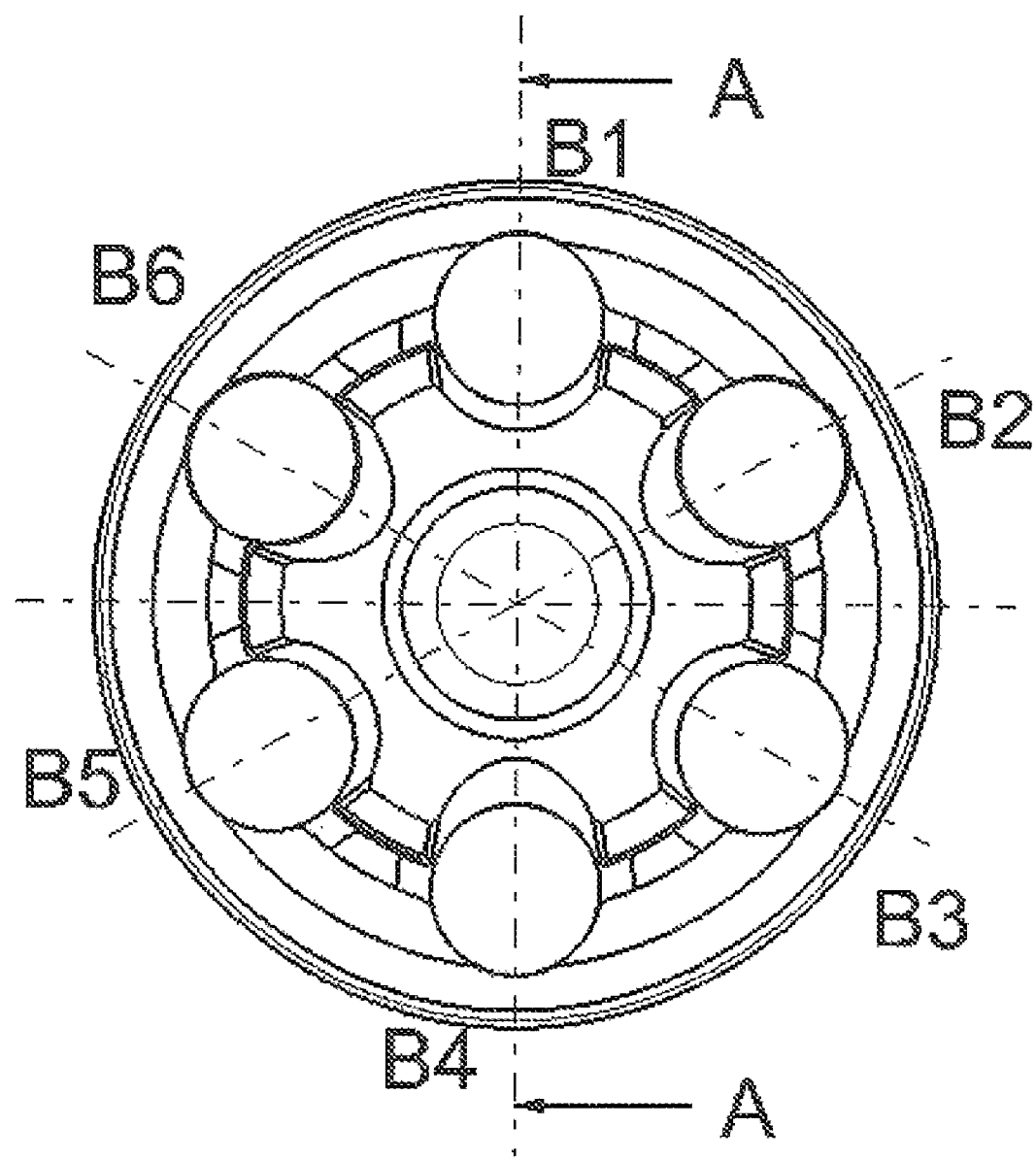
FIGS. 9(a) to 9(i) are cross-sectional views illustrating the fixed type joints constructed according to a fifth preferred embodiment of the present invention.
Figure 9B:
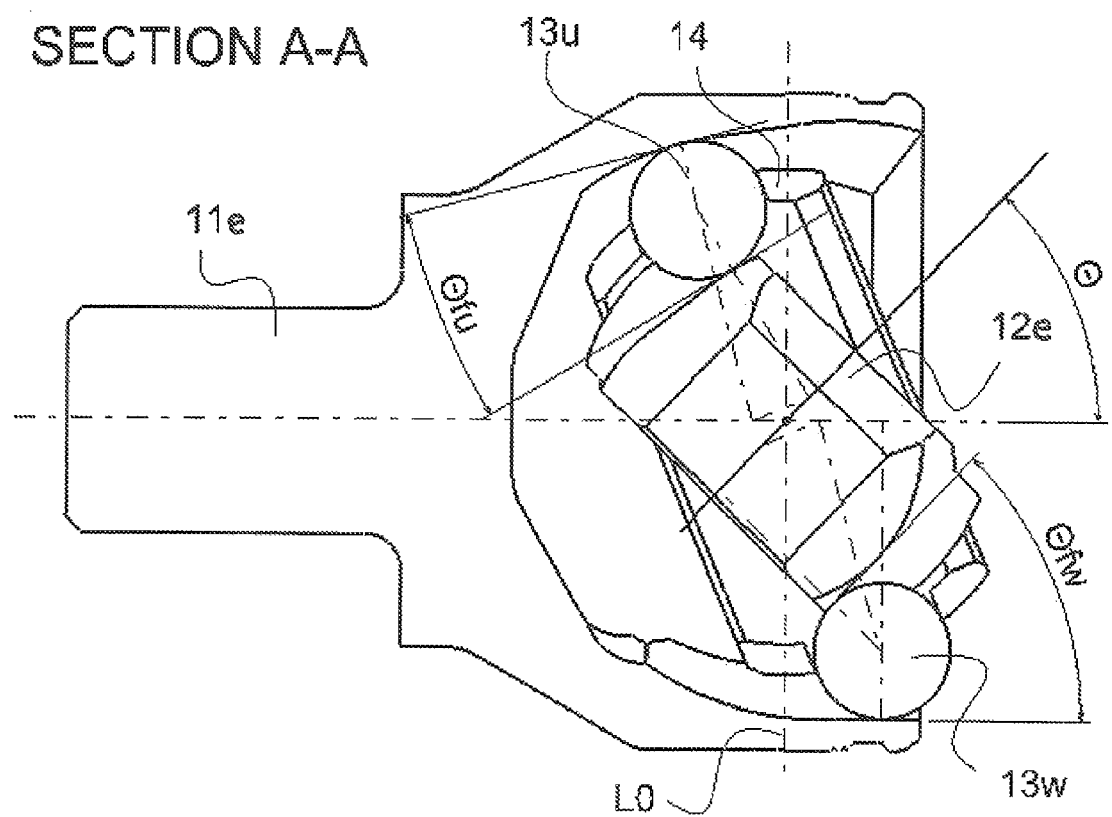
Figure 9C:
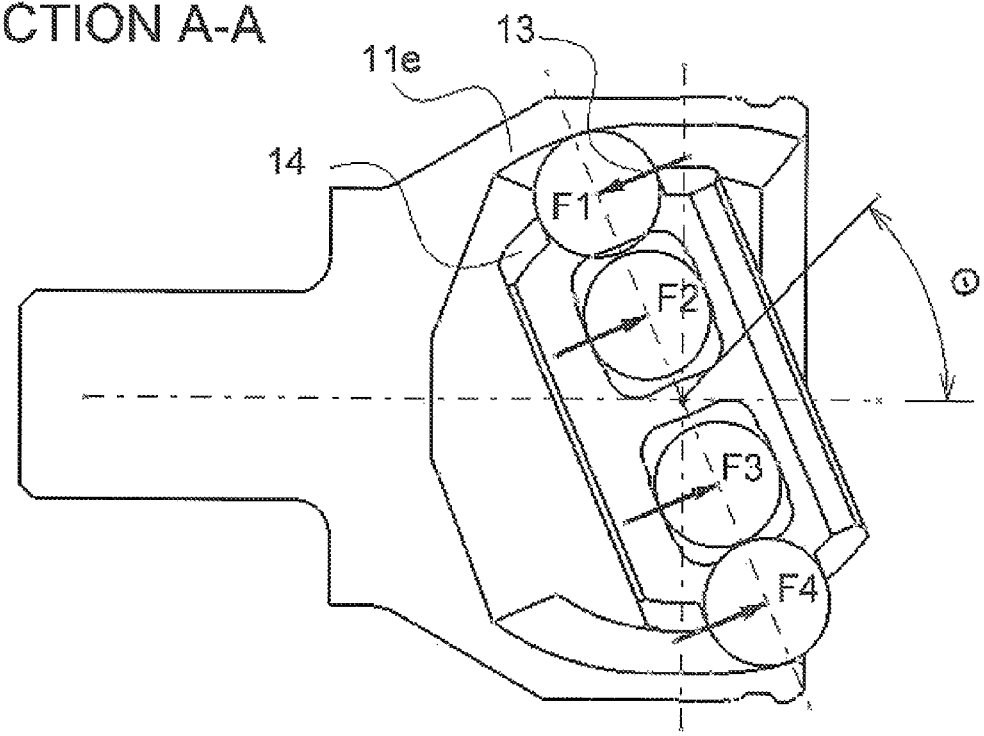
Figure 9D:
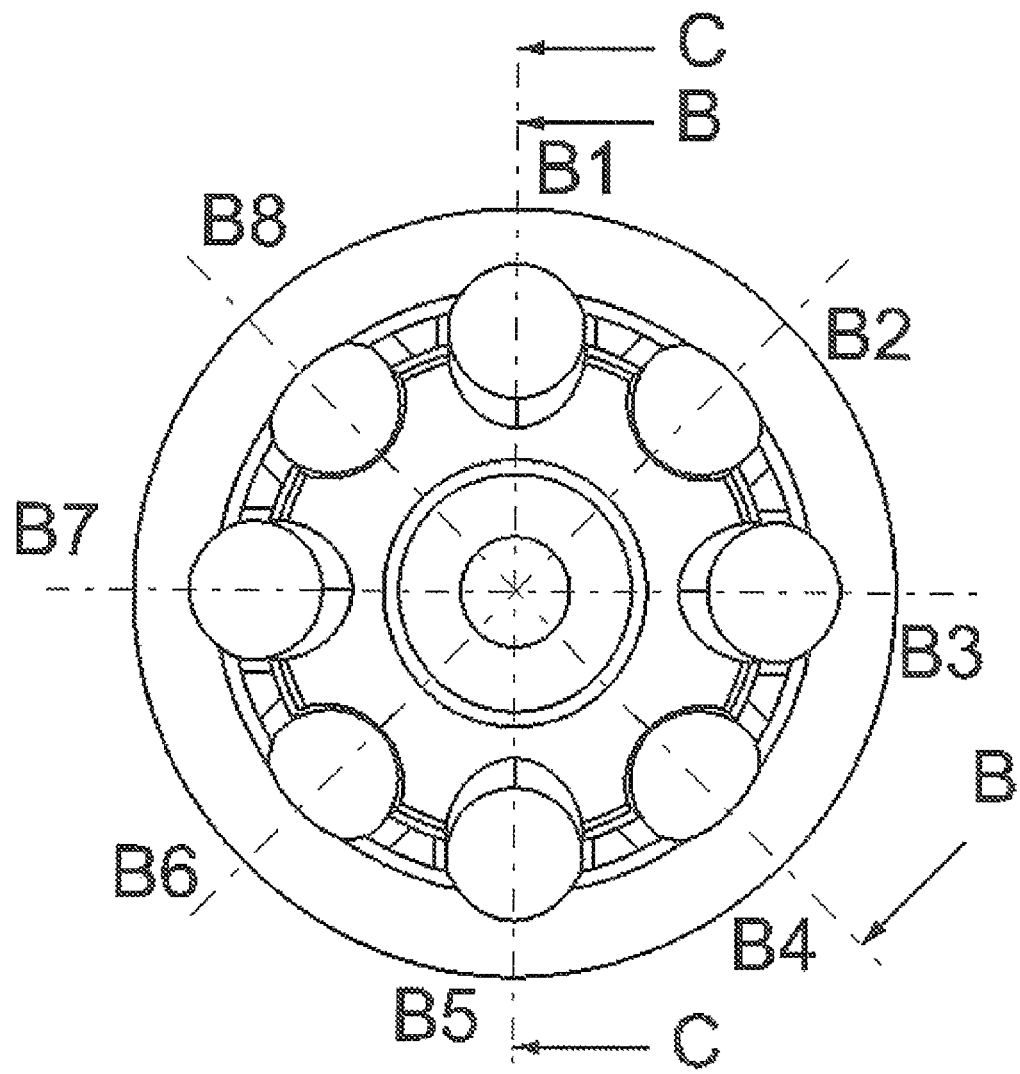
Figure 9E:
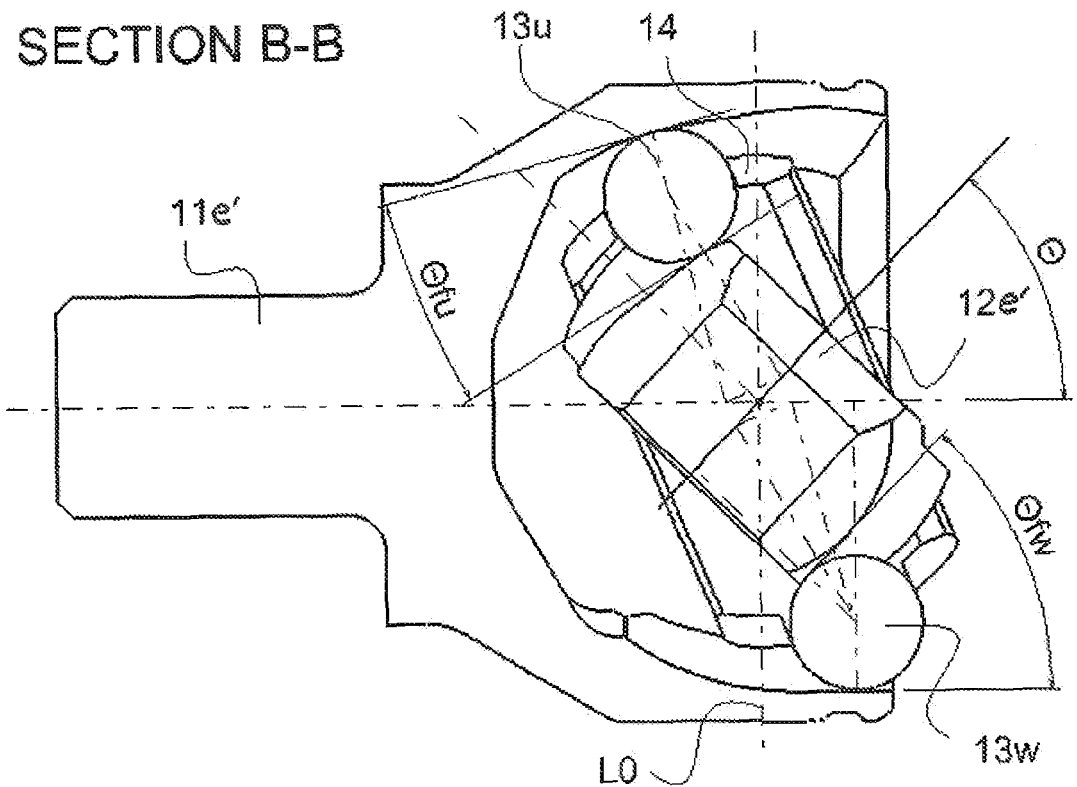
Figure 9F:
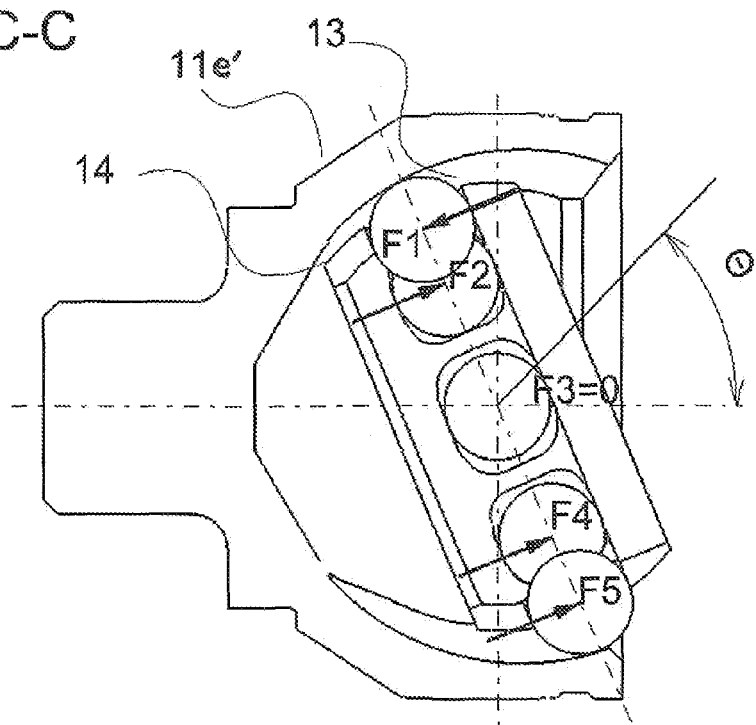
Figure 9G:
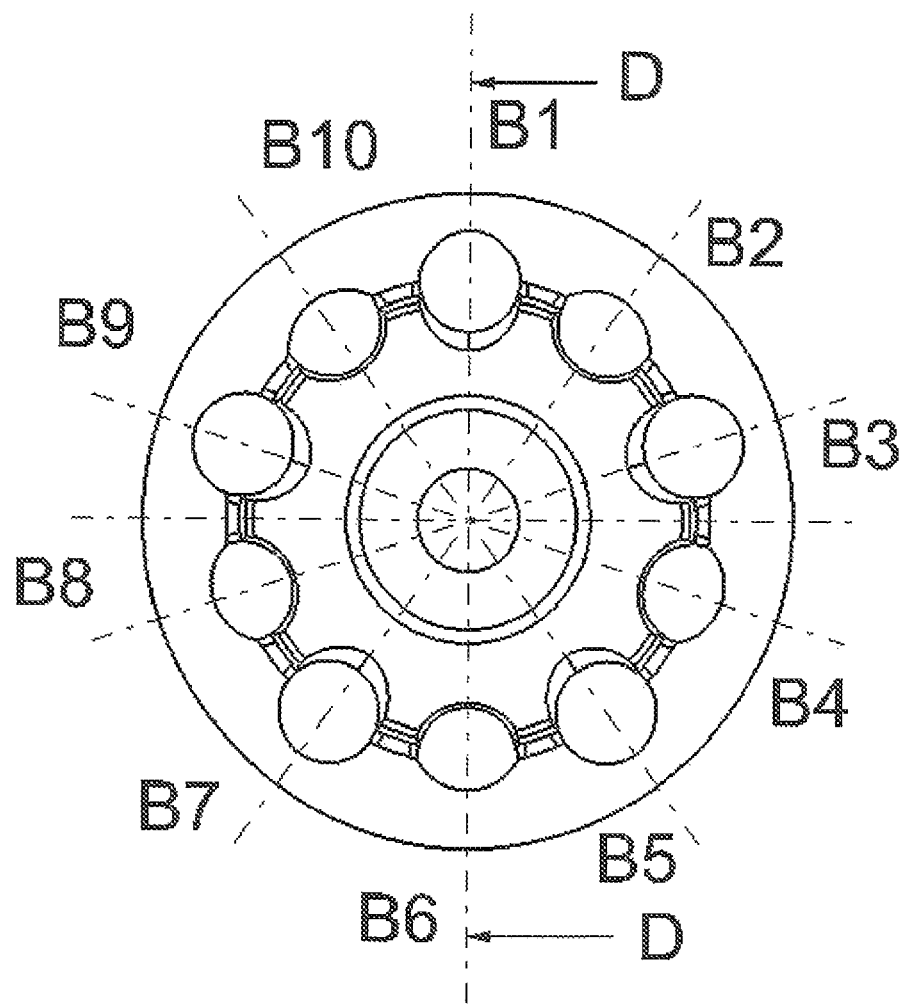
Figure 9H:
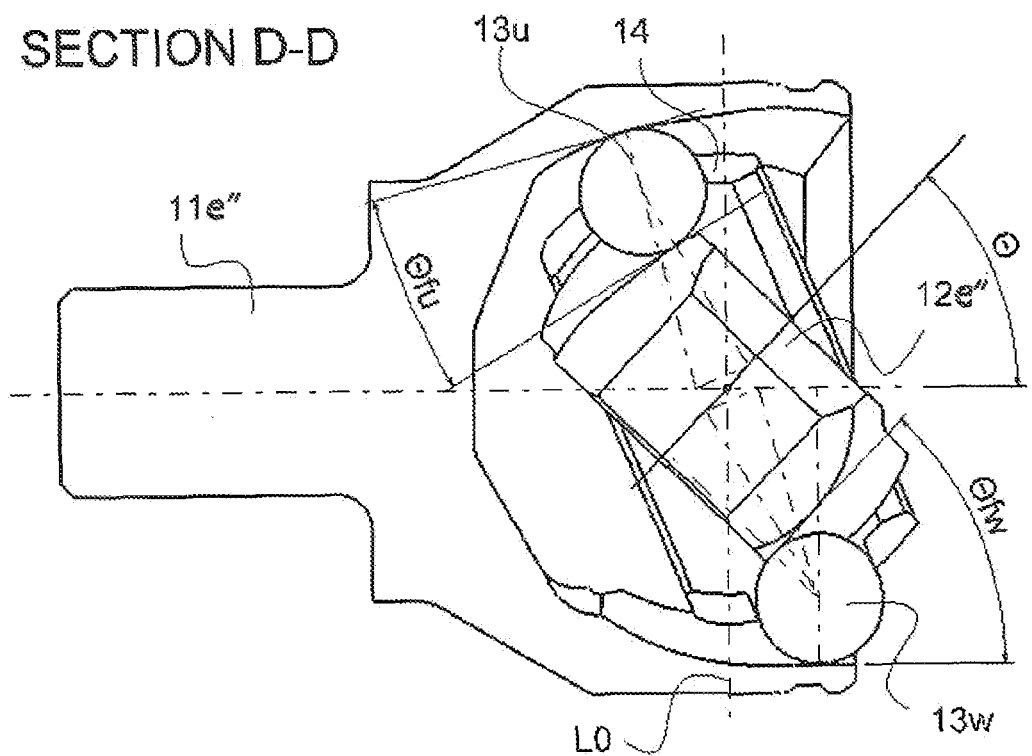

FIGS. 9(d) and 9(e) illustrate a eight ball type fixed joint structure of the invention with its outer race 11e' and inner race 12e' having the alternative groove configuration, in combination of the typical undercut-free groove shape for positions B1, B3, B5 and B7, and the groove shapes of the embodiment 2 for positions B2, B4, B6 and B8, disposed alternately to each other. FIG. 9(f) illustrates the ball contact forces F1, F2, F3, F4 and F5 produced due to the funnel angle for each groove. This structure can accommodate similar advantages to embodiment 2, in terms of cage strength and durability by the reduction of minimum assembly angle and the total ball contact forces on the cage.

Figure 9I:
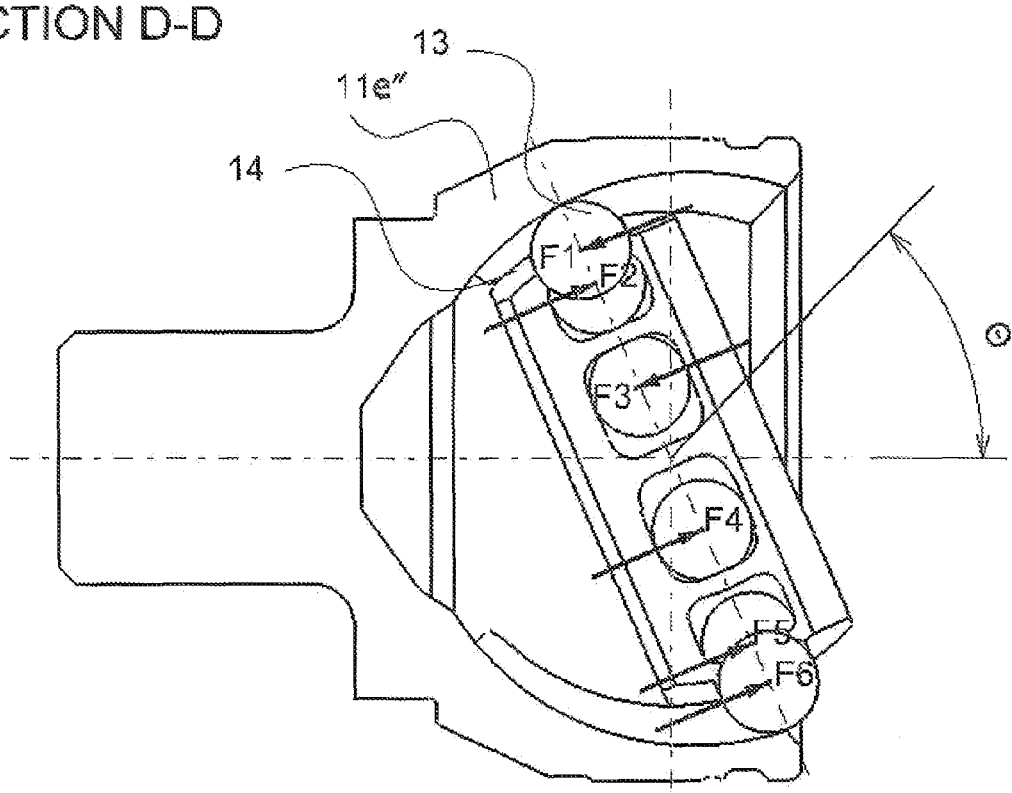

FIGS. (9g) and (9h) illustrate a ten ball type fixed joint structure of the invention with its outer race 11e" and inner race 12e" having the alternative groove configuration, in combination of the typical undercut-free groove shape for positions B1, B3, B5, B7 and B9, and the groove shapes of the embodiment 2 for positions B2, B4, B6, B8 and B10, disposed alternately. FIG. 9(i) illustrates the ball contact forces F1, F2, F3, F4, F5 and F6 produced by the funnel angle configuration of each groove. This structure can accommodate similar advantages to embodiment 2, in terms of cage strength and durability by the reduction of minimum assembly angle and the total ball contact forces on the cage.

In this embodiment as illustrated above in connection with FIGS. 9(a)-9(i), the alternate groove combination is described to have the combination of the typical undercut-free groove shape and embodiment 2. However, it is particularly noted that this application of alternative groove can be made by the combination of the undercut-free joint groove and that of embodiment 1 or 3. The details of such alternative configurations are not shown for simplicity purposes.

Embodiment 6

With reference to FIGS. 10(a)-10(g), the sixth embodiment of the invention is described herein, which discloses another type of alternate groove configurations of the invention, in combination of the two variable funnel angle groove configurations among the above described embodiments 1 to 3. As such, the present embodiment includes some common aspects with the above described embodiments of the invention, however, the detailed description of which are omitted herein for simplicity purposes.

Figure 10A:
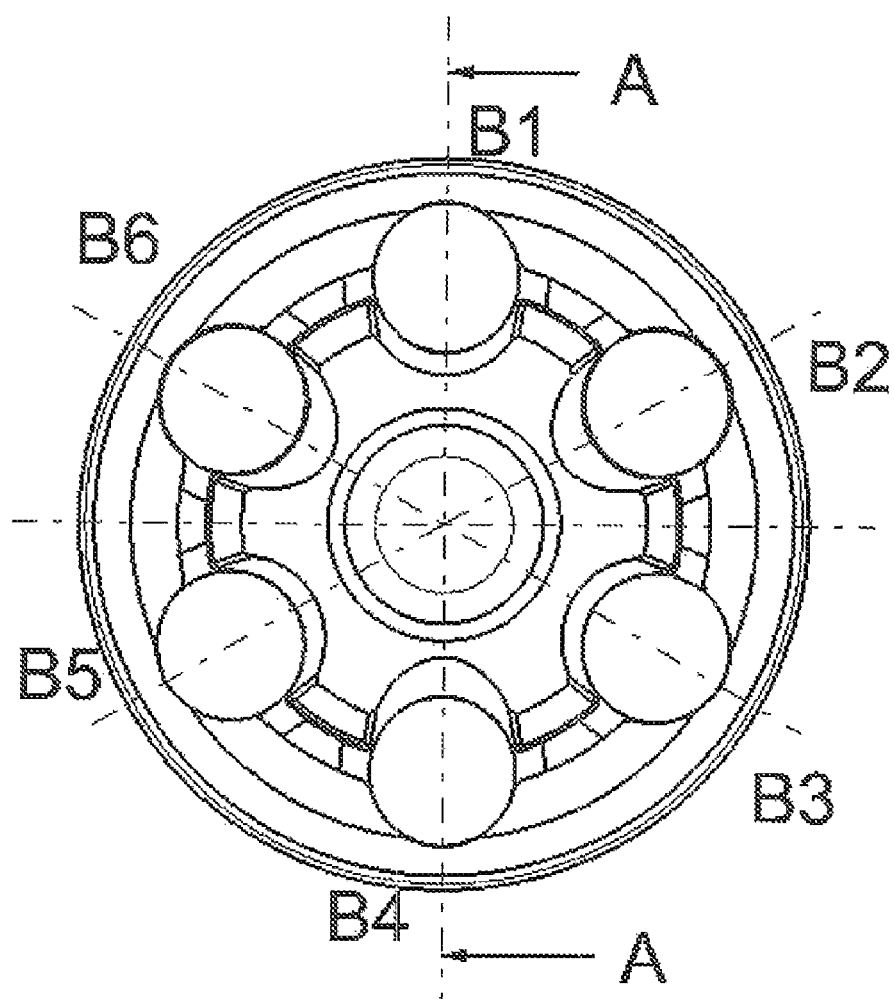
FIGS. 10(a) to 10(g) are cross-sectional views illustrating the fixed type joints constructed according to a sixth preferred embodiment of the present invention
Figure 10B:
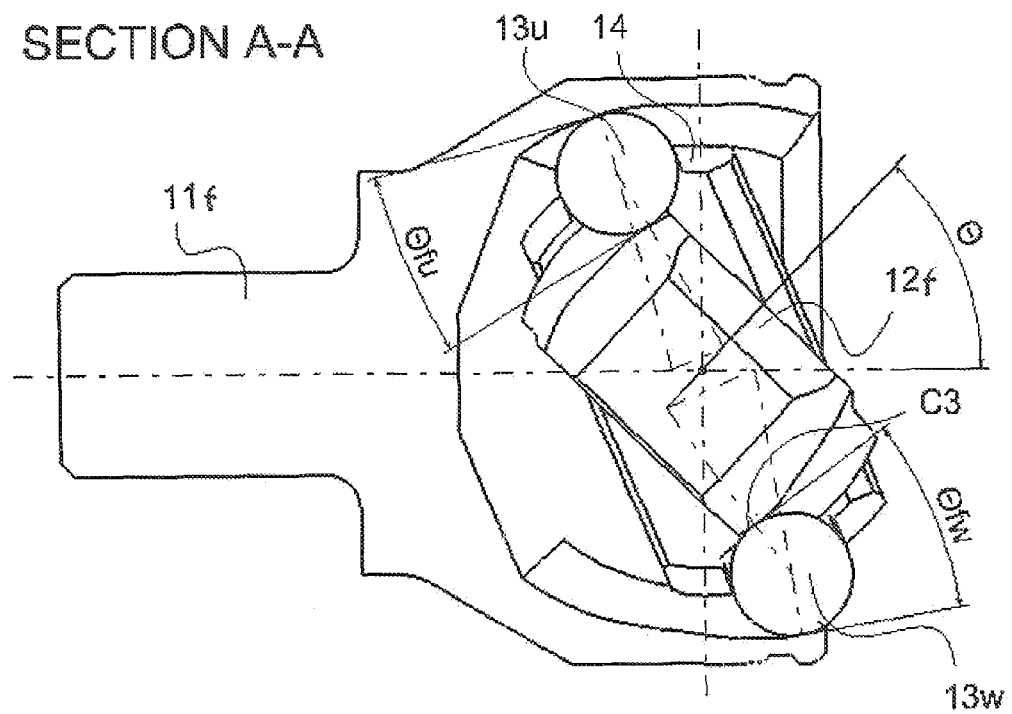
Figure 10C:
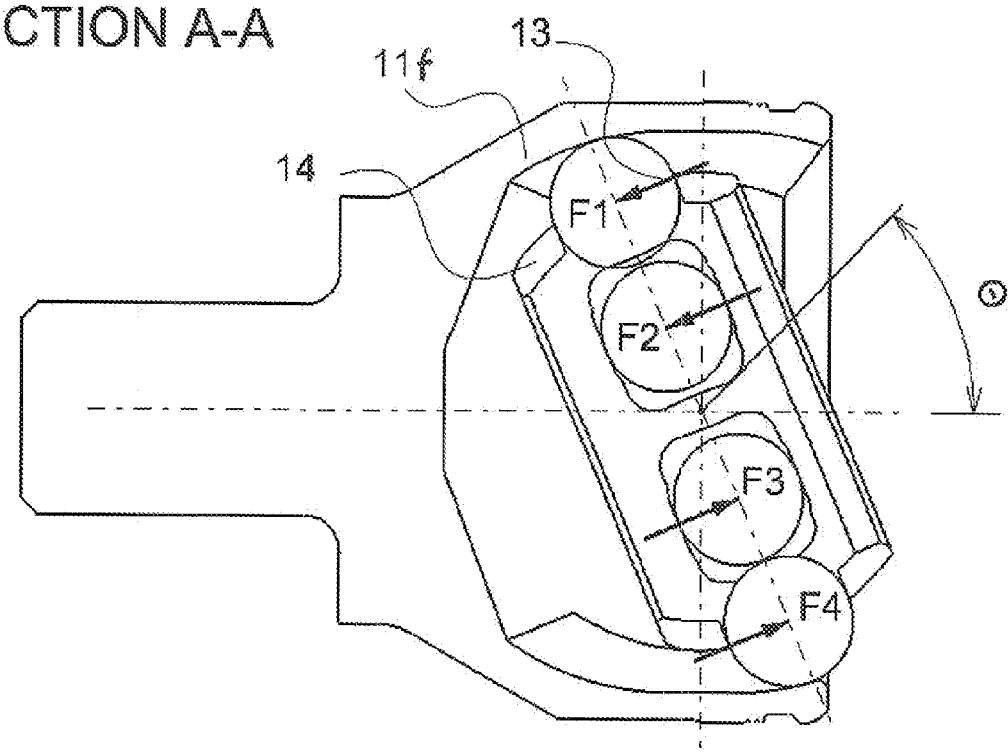

FIGS. 10(a) and 10(b) illustrate a six ball type fixed joint structure of the invention with its outer race 11f and inner race 12f having the alternate groove configurations, in the combination of the groove shapes of embodiment 1 for positions B1, B3 and B5 and the groove shapes of the embodiment 2 for positions B2, B4 and B6, disposed alternatively to each other. FIG. 10(c) illustrates the ball contact forces F1, F2, F3 and F4 produced by the funnel angle configuration of the respective groove. This structure is advantageous for improving cage strength and durability through the reduction of minimum assembly angle and the total ball contact forces on the cage.

Figure 10D:
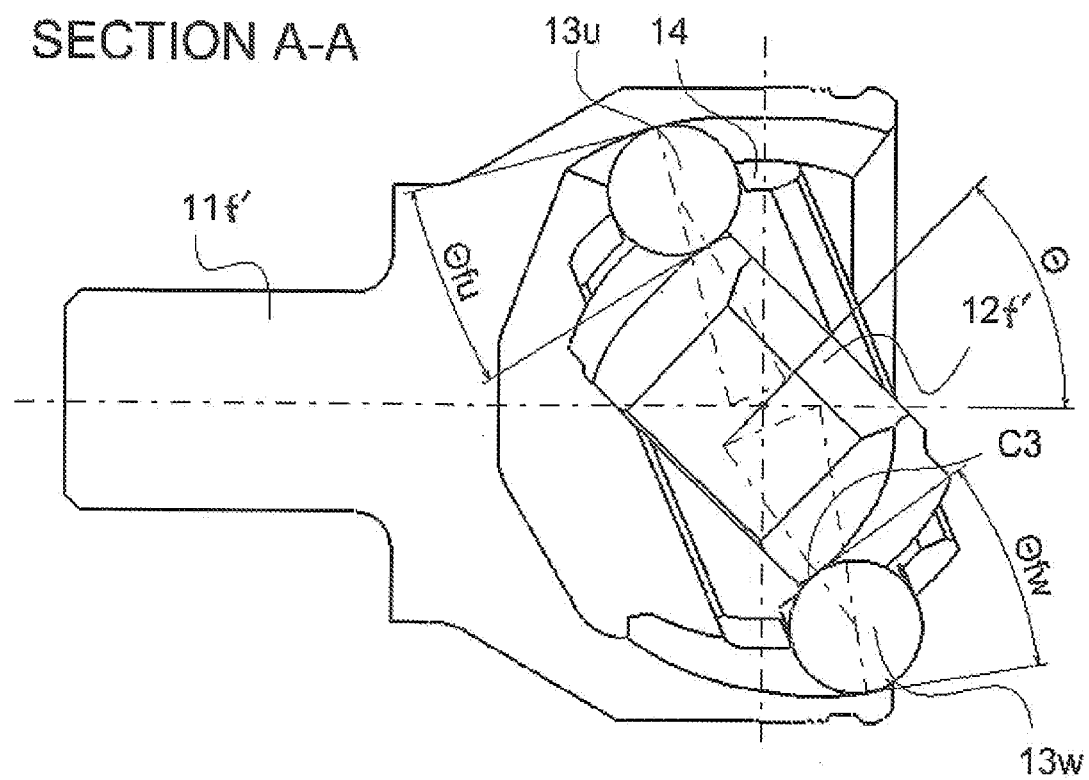
Figure 10E:
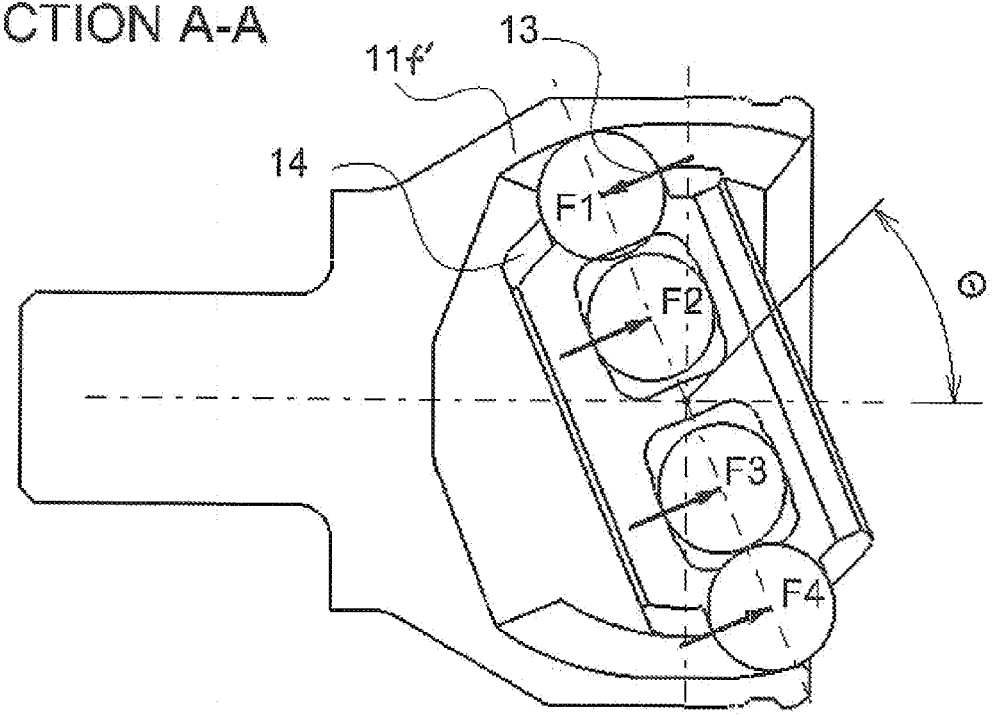

FIG. 10(d) illustrates a six ball type fixed joint structure of the invention with its outer race 11f' and inner race 12f' having the alternative groove configuration, in the combination of the groove shapes of embodiment 1 for positions B1, B3 and B5 and the groove shapes of embodiment 3 for positions B2, B4 and B6, disposed alternately to each other. FIG. 10(e) illustrates the ball contact forces F1, F2, F3 and F4 produced by the funnel angle configuration of each groove. This structure is advantageous for improving cage strength and durability through the reduction of minimum assembly angle and the total ball contact forces on the cage.

Figure 10F:
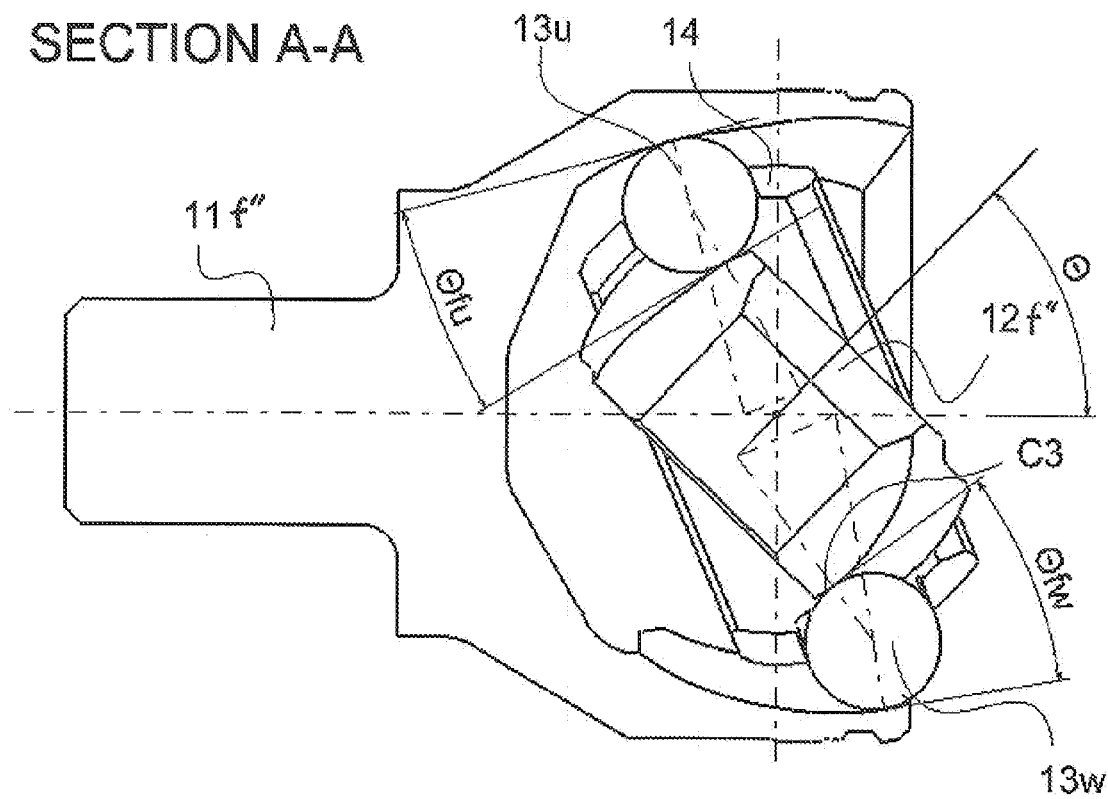
Figure 10G:
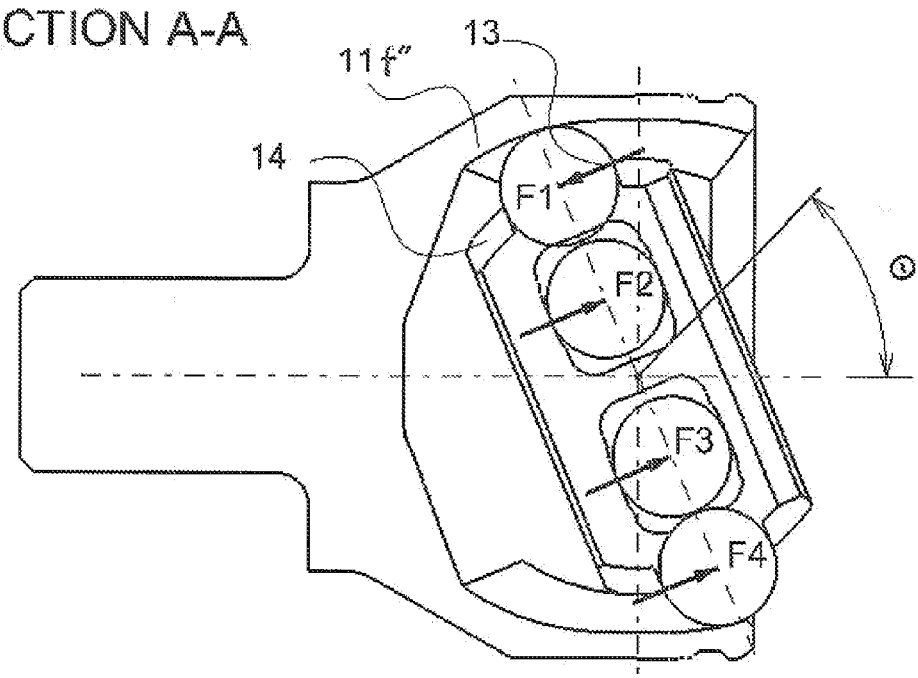

FIG. 10(f) illustrates a six ball type fixed joint structure of the invention with its outer race 11f'" and inner race 12f'" having the alternative groove, in the combination of the groove shapes of embodiment 2 for positions B1, B3 and B5 and the groove shapes of embodiment 3 for positions B2, B4 and B6, disposed alternatively. FIG. 10(g) illustrates the ball contact forces F1, F2, F3 and F4 produced by the funnel angle configurations of each groove. This structure is advantageous for improving cage strength and durability through the reduction of minimum assembly angle and the total ball contact forces on the cage.

In this embodiment as illustrated above in connection with FIGS. 10(a)-10(g), the alternate groove combination is described in connection with the six ball type joint. However, it is particularly noted that such combinations of alternate grooves can also be applied in similar manner as described above to the fixed type joint containing eight, then, or more balls in the ball grooves.

As described above, the fixed type joint of the invention can provide a reliable construction with suitable strength and durability by adopting a variable funnel angle configuration to the track grooves of the joint as exemplified by the above-described embodiments of the invention. Moreover, due to the improved and optimized structure designs, the present invention is also effectively applicable to the fixed type joint with high balls, namely, from six balls to ten balls or more.

As described above, the constant velocity joint of the present invention is described mainly in connection with several exemplary embodiments thereof. The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A fixed type constant velocity joint comprising:
an outer race having an inner spherical surface, and a plurality of guide grooves formed in an axial direction in the inner spherical surface of the outer race;
an inner race having an outer spherical surface, and a plurality of guide grooves formed in an axial direction in the outer spherical surface of the inner race, said guide grooves of the outer race and said guide grooves of the inner race together forming a plurality of ball guide tracks;
a plurality of balls disposed in the ball guide tracks; and
a cage installed between the inner spherical surface of the outer race and the outer spherical surface of the inner race, said cage having a plurality of windows for retaining the balls therein;
wherein each of the guide grooves of the outer race is shaped to have a longitudinal cross section formed with two circular regions with different centers, a first circular region disposed at a first lateral side of the outer race and a second circular region disposed at a second lateral side of the outer race, and a linear region tangentially extending between these two circular regions; and wherein each of the guide grooves of the inner race is shaped to have a longitudinal cross section formed with two circular regions with different centers, a first circular region disposed at a first lateral side of the inner race and a second circular region disposed at a second lateral side of the inner race, and a linear region tangentially extending between these two circular regions.

2. The constant velocity joint of claim 1, wherein each of the ball guide tracks formed of the corresponding guide grooves of the outer and inner races define a variable funnel angle therein.

3. The constant velocity joint of claim 1, wherein the first circular region of the guide grooves of the outer race and the first circular region of the guide grooves of the inner race have a first common center, and the second circular region of the guide grooves of the outer race and the second circular region of the guide grooves of the inner race have a second common center, and wherein the first and second common centers are located in opposite sides from a joint center line of the joint.

4. The constant velocity joint of claim 3, wherein the first common center and the second common center are located symmetrically in opposite sides from the joint center line of the joint, and the linear region tangentially extending between these two circular regions is in parallel alignment with a longitudinal axis of the particular inner or outer race.

5. The constant velocity joint of claim 1, wherein the first circular region of the guide grooves of the outer race has a first center, the second circular region of the guide grooves of the outer race has a second center, the first circular region of the guide grooves of the inner race has a third center, the second circular region of the guide grooves of the inner race has a fourth center, wherein the first and third centers are located towards the first lateral side, and the second and fourth centers are located towards the second lateral side, and the linear region tangentially extending between these two circular regions is in sloped alignment with a longitudinal axis of the particular inner or outer race.

6. The constant velocity joint of claim 5, wherein the first center is located outside from the third center, and the fourth center located outside from the second center.

7. The constant velocity joint of claim 1, wherein the first circular region of the guide grooves of the outer race has a first center, the second circular region of the guide grooves of the outer race has a second center, the first circular region of the guide grooves of the inner race has a third center, the second circular region of the guide grooves of the inner race has a fourth center, and wherein the first and second centers are located towards the first lateral side, and wherein the third and fourth centers are located towards the second lateral side, and the linear region tangentially extending between these two circular regions is in sloped alignment with a longitudinal axis of the particular inner or outer race.

8. The constant velocity joint of claim 7, wherein the first center is located outside from the second center, and the fourth center is located outside from the third center.

9. The constant velocity joint of claim 1, wherein the joint comprises six or more balls.

\* \* \* \* \*